(12) United States Patent
Bussio

(10) Patent No.: US 9,567,760 B2
(45) Date of Patent: Feb. 14, 2017

(54) SYSTEM AND METHOD FOR MAKING POLYMER CONCRETE

(71) Applicant: Vincent A. Bussio, Orem, UT (US)

(72) Inventor: Vincent A. Bussio, Orem, UT (US)

(73) Assignee: Geneva Polymer Products, LLC, Orem, UT (US)

( * ) Notice: Subject to any disclaimer, the term of this patent is extended or adjusted under 35 U.S.C. 154(b) by 0 days.

(21) Appl. No.: 14/029,573

(22) Filed: Sep. 17, 2013

(65) Prior Publication Data

US 2014/0115975 A1    May 1, 2014

Related U.S. Application Data

(63) Continuation of application No. 13/861,316, filed on Apr. 11, 2013, now abandoned, which is a continuation-in-part of application No. 13/676,084, filed on Nov. 13, 2012, now abandoned, which is a continuation of application No. 13/537,027, filed on
(Continued)

(51) Int. Cl.
| | |
|---|---|
| *E04G 21/14* | (2006.01) |
| *B29C 39/42* | (2006.01) |
| *E03B 7/09* | (2006.01) |
| *E02D 29/12* | (2006.01) |
| *B28B 7/16* | (2006.01) |
| *B29C 67/24* | (2006.01) |

(Continued)

(52) U.S. Cl.
CPC ............ *E04G 21/142* (2013.01); *B28B 7/168* (2013.01); *B29C 39/42* (2013.01); *B29C 67/243* (2013.01); *E02D 29/12* (2013.01); *E02D 29/124* (2013.01); *E03B 7/09* (2013.01); *E03F 5/02* (2013.01); *E03F 5/024* (2013.01); *F16L 1/038* (2013.01)

(58) Field of Classification Search
CPC ........... E04G 21/142; E03F 5/024; E03F 5/02; F16L 1/038; E02D 29/12; E02D 29/124; B28B 19/0038
USPC .................................... 52/20, 21; 404/25, 26
See application file for complete search history.

(56) References Cited

U.S. PATENT DOCUMENTS

| | | |
|---|---|---|
| 992,782 A | 5/1911 | Lambie |
| 1,582,191 A | 4/1926 | Snooke |

(Continued)

FOREIGN PATENT DOCUMENTS

| | | | |
|---|---|---|---|
| DE | 19938806 | 2/2001 | |
| JP | 03144019 A | * 6/1991 | ............ E02D 29/12 |

(Continued)

OTHER PUBLICATIONS

ASTM International, Designation C478-12, Standard Specification for Precast Reinforced Concrete Manhole Sections, current edition approved Apr. 1, 2012, originally approved 1961.

(Continued)

*Primary Examiner* — Joshua J Michener
*Assistant Examiner* — Matthew Gitlin
(74) *Attorney, Agent, or Firm* — Clayton, Howarth & Cannon, P.C.

(57) ABSTRACT

Resin-based structures for use in corrosive environments. The resin-based structures may include a mixture of resin and aggregate. The resin-based structures may be formed in a mold by placing aggregate and resin into the mold. The resin-based structures may have thin wall design with high compression and tension strength.

22 Claims, 18 Drawing Sheets

Related U.S. Application Data

Jun. 28, 2012, now abandoned, which is a continuation of application No. 13/372,393, filed on Feb. 13, 2012, now abandoned, which is a continuation of application No. 13/245,821, filed on Sep. 26, 2011, now abandoned.

(60) Provisional application No. 61/747,190, filed on Dec. 28, 2012, provisional application No. 61/386,439, filed on Sep. 24, 2010.

(51) Int. Cl.
*E03F 5/02* (2006.01)
*F16L 1/038* (2006.01)

(56) References Cited

U.S. PATENT DOCUMENTS

| | | | |
|---|---|---|---|
| 1,712,510 A | 5/1929 | Monie | |
| 3,217,077 A | 11/1965 | Cocke | |
| 3,742,985 A | 7/1973 | Rubenstein | |
| 3,767,232 A | 10/1973 | Smith | |
| 3,938,285 A * | 2/1976 | Gilbu | 52/20 |
| 4,005,253 A | 1/1977 | Walter | |
| RE29,636 E * | 5/1978 | Gilbu | 52/20 |
| 4,102,088 A | 7/1978 | Keller et al. | |
| 4,170,248 A | 10/1979 | Bennett et al. | |
| 4,260,445 A * | 4/1981 | Mayumi et al. | 156/276 |
| 4,275,757 A * | 6/1981 | Singer | 137/363 |
| 4,341,236 A | 7/1982 | LaBenz | |
| 4,401,397 A | 8/1983 | Sommer et al. | |
| 4,427,818 A | 1/1984 | Prusinski | |
| 4,473,322 A | 9/1984 | Echols et al. | |
| 4,483,643 A | 11/1984 | Guggemos | |
| 4,497,590 A | 2/1985 | Chase | |
| 4,585,371 A | 4/1986 | Jones-Hinton | |
| 4,608,280 A | 8/1986 | Robinson et al. | |
| 4,621,941 A * | 11/1986 | Ditcher et al. | 404/26 |
| 4,630,963 A | 12/1986 | Wyman | |
| 4,737,220 A | 4/1988 | Ditcher et al. | |
| 4,768,562 A | 9/1988 | Strand | |
| 4,816,503 A | 3/1989 | Cunningham et al. | |
| 4,889,449 A | 12/1989 | Lee | |
| 4,909,519 A | 3/1990 | Anderson | |
| 4,938,627 A | 7/1990 | Lee | |
| 4,995,584 A | 2/1991 | Trimble | |
| 4,997,602 A | 3/1991 | Trimble | |
| 4,999,396 A | 3/1991 | Farrell | |
| 5,017,313 A | 5/1991 | Trimble | |
| 5,032,197 A | 7/1991 | Trimble | |
| 5,106,440 A | 4/1992 | Tangeman | |
| 5,242,637 A * | 9/1993 | Inoue et al. | 264/45.3 |
| 5,242,708 A | 9/1993 | Fekete et al. | |
| 5,271,193 A * | 12/1993 | Olsen et al. | 52/19 |
| 5,296,187 A * | 3/1994 | Hackman | 264/257 |
| 5,384,355 A | 1/1995 | Allen | |
| 5,386,669 A | 2/1995 | Almeida | |
| 5,405,218 A | 4/1995 | Hyde-Smith | |
| 5,415,499 A | 5/1995 | Hyde-Smith et al. | |
| 5,458,155 A | 10/1995 | Stephens | |
| 5,494,741 A | 2/1996 | Fekete et al. | |
| 5,511,897 A | 4/1996 | House et al. | |
| 5,531,485 A | 7/1996 | House et al. | |
| 5,542,780 A * | 8/1996 | Kourgli | 405/55 |
| 5,608,998 A | 3/1997 | Hume | |
| 5,705,239 A | 1/1998 | Andersen et al. | |
| 5,725,328 A | 3/1998 | Schmager | |
| 5,771,518 A | 6/1998 | Roberts | |
| 5,791,378 A | 8/1998 | Stephens | |
| 5,872,168 A | 2/1999 | Katoot | |
| 5,876,533 A | 3/1999 | House et al. | |
| 5,915,886 A | 6/1999 | McNeil | |
| 5,928,447 A | 7/1999 | GianFrancisco | |
| 5,946,880 A | 9/1999 | Morrison, III et al. | |
| 5,956,905 A | 9/1999 | Wiedrich | |
| 5,981,050 A | 11/1999 | Kaempen et al. | |
| 5,996,304 A | 12/1999 | Barker et al. | |
| 6,034,155 A | 3/2000 | Espeland et al. | |
| 6,048,593 A | 4/2000 | Espeland et al. | |
| 6,089,279 A | 7/2000 | Clarke et al. | |
| 6,135,141 A | 10/2000 | Bombach | |
| 6,146,556 A | 11/2000 | Katoot | |
| 6,167,912 B1 | 1/2001 | Stephens | |
| 6,195,944 B1 | 3/2001 | Goldthorpe | |
| 6,196,760 B1 | 3/2001 | Sinclair | |
| 6,226,928 B1 | 5/2001 | Trangsrud | |
| 6,315,492 B1 | 11/2001 | McIntosh | |
| 6,340,442 B1 | 1/2002 | Brokmann | |
| 6,415,824 B2 | 7/2002 | Stephens | |
| 6,494,978 B1 | 12/2002 | Bertram | |
| 6,565,935 B1 | 5/2003 | Lohnes | |
| 6,613,228 B2 | 9/2003 | Petersen et al. | |
| 6,790,544 B2 | 9/2004 | Schmitz | |
| 6,877,281 B1 | 4/2005 | Gavin | |
| 7,018,577 B2 * | 3/2006 | Bilgram et al. | 264/135 |
| 7,165,578 B2 | 1/2007 | Kamiyama et al. | |
| 7,223,051 B2 | 5/2007 | Vought et al. | |
| 7,273,524 B2 | 9/2007 | Tomita et al. | |
| 7,294,292 B2 | 11/2007 | Akutsu et al. | |
| 7,300,610 B2 | 11/2007 | Loeffler-Lenz | |
| 7,517,922 B2 | 4/2009 | Wyman | |
| 7,605,206 B2 | 10/2009 | Abecassis | |
| 7,628,949 B2 | 12/2009 | Blackmore | |
| 7,819,435 B2 | 10/2010 | Kamiyama et al. | |
| 7,955,026 B2 | 6/2011 | Kamiyama et al. | |
| 8,327,886 B2 | 12/2012 | Nishiyama | |
| 8,360,108 B2 | 1/2013 | Kamiyama et al. | |
| 2001/0000874 A1 | 5/2001 | Stephens | |
| 2003/0136455 A1 | 7/2003 | Kamiyama et al. | |
| 2004/0107876 A1 | 6/2004 | Tomita et al. | |
| 2004/0108009 A1 | 6/2004 | Kamiyama et al. | |
| 2005/0238437 A1 | 10/2005 | Kamiyama et al. | |
| 2009/0102090 A1 | 4/2009 | Mottahedeh | |
| 2010/0008729 A1 | 1/2010 | Kamiyama et al. | |
| 2010/0209196 A1 | 8/2010 | Harvey | |
| 2013/0241199 A1 | 9/2013 | Bussio | |
| 2013/0284298 A1 | 10/2013 | Kamiyama et al. | |
| 2014/0115975 A1 | 5/2014 | Bussio | |

FOREIGN PATENT DOCUMENTS

| | | | | |
|---|---|---|---|---|
| JP | 06026065 A * | 2/1994 | | E02D 29/14 |
| JP | 2002309598 | 10/2002 | | |
| JP | 200697368 | 4/2006 | | |
| KR | 100750717 | 8/2007 | | |
| KR | 100840360 | 6/2008 | | |
| WO | WO 9118151 A1 * | 11/1991 | | E02D 29/12 |

OTHER PUBLICATIONS

Transpo Industries, Inc., BODAN® Highway/Rail Grade Crossing System, YouTube video uploaded Apr. 20, 2009 at http://www.youtube.com/watch?v=M8Y_ZYJ8a8s (PDF of corresponding PowerPoint presentation submitted).

* cited by examiner

SYSTEM AND METHOD FOR MAKING POLYMER CONCRETE

CROSS-REFERENCE TO RELATED APPLICATIONS

This application is a continuation of U.S. patent application Ser. No. 13/861,316, filed Apr. 11, 2013, which claims the benefit of U.S. Provisional Patent Application No. 61/747,190, filed Dec. 28, 2012, and application Ser. No. 13/861,316 is also a continuation-in-part of U.S. patent application Ser. No. 13/676,084, filed Nov. 13, 2012, which is a continuation of U.S. patent application Ser. No. 13/537,027, filed Jun. 28, 2012, which is a continuation of U.S. patent application Ser. No. 13/372,393, filed Feb. 13, 2012, which is a continuation of U.S. patent application Ser. No. 13/245,821, filed Sep. 26, 2011, which claimed the benefit of U.S. Provisional Application No. 61/386,439, filed on Sep. 24, 2010, which are hereby incorporated by reference herein in their entirety, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to polymer concrete structures, and systems and methods for making the same.

2. Description of Related Art

Traditional concrete is a material composed of two main materials, namely, common cement and aggregate, that are mixed together in a mixer and then poured into a form. Common cement is traditionally made by heating limestone, with small quantities of other materials, in a kiln. The resulting hard substance removed from the kiln is then ground with a small amount of gypsum into a powder to make the cement. The aggregate mixed with the cement may comprise coarse particulate material, that including sand and gravel. One drawback to the use of common cement in concrete is that it tends to breakdown over time. For example, common cement used in concrete may breakdown due to microorganisms that actually may feed on the cement itself.

Recent advancements in concrete technology have resulted in the common cement traditionally used in concrete being replaced with a synthetic resin, such as polymer resin. For example, in the past, polymer concrete was formed by mixing a polymer with an aggregate in a mixer. One significant drawback to the use of a polymer in a mixer is that due to the polymer's relatively short cure time, the mixer may be ruined, or rendered unusable for a significant period of time, unless the polymer and aggregate mixture is quickly removed from the mixer. One object of the present invention is to eliminate the need for mixing the polymer and aggregate in a mixer.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
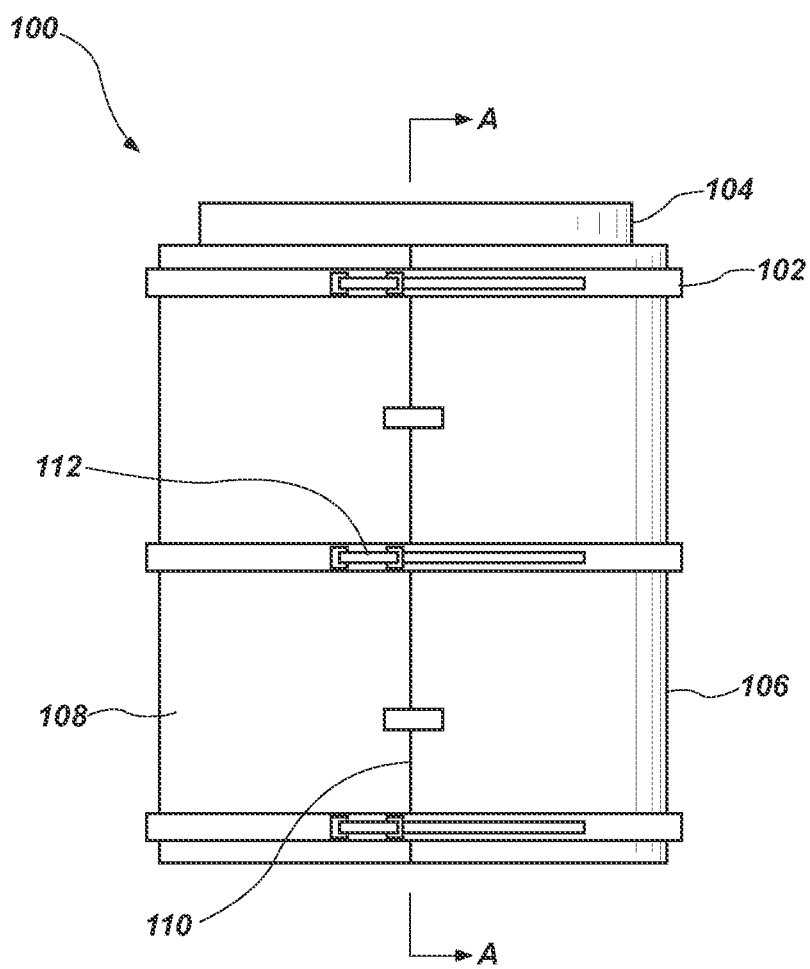
FIG. 1 is a side view of a mold pursuant to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Referring now to FIG. 1, there is depicted a mold 100 for forming a resin-based structure pursuant to an embodiment of the present disclosure. The mold 100 may include an outer mold or wall 102 and in inner mold or wall 104. It will be appreciated that the mold 100 may take virtually any size or shape. The mold 100 may be manufactured to any shape and size to meet any specification required. In an embodiment of the present disclosure, the mold 100 may be utilized to form a structure with an opening and detachable cover that gives access to an enclosed area, such as a sewer, drain or tank. In an embodiment of the present disclosure, the mold 100 may be utilized to form a manhole for use in accessing a sewer, drain, or tank. In an embodiment of the present disclosure, the mold 100 may be utilized to form a pipe for use in an underground system for carrying sewage or water. In an embodiment of the present disclosure, the mold 100 may be utilized to form a vault structure. In an embodiment of the present disclosure, the mold 100 may be utilized to form a raceway for use in a sewage treatment plant.

The outer mold 102 may be formed from two pieces 106 and 108. The two pieces 106 and 108 may mate together along a first joint 110 and a second joint (not visible in FIG. 1). Locking devices 112 may secure the two pieces 106 and 108 of the outer mold 102 together. In an embodiment of the present disclosure, the outer mold 102 may be of unitary construction. The inner mold 104 may be sized to fit inside of the outer mold 102.

Figure 2:
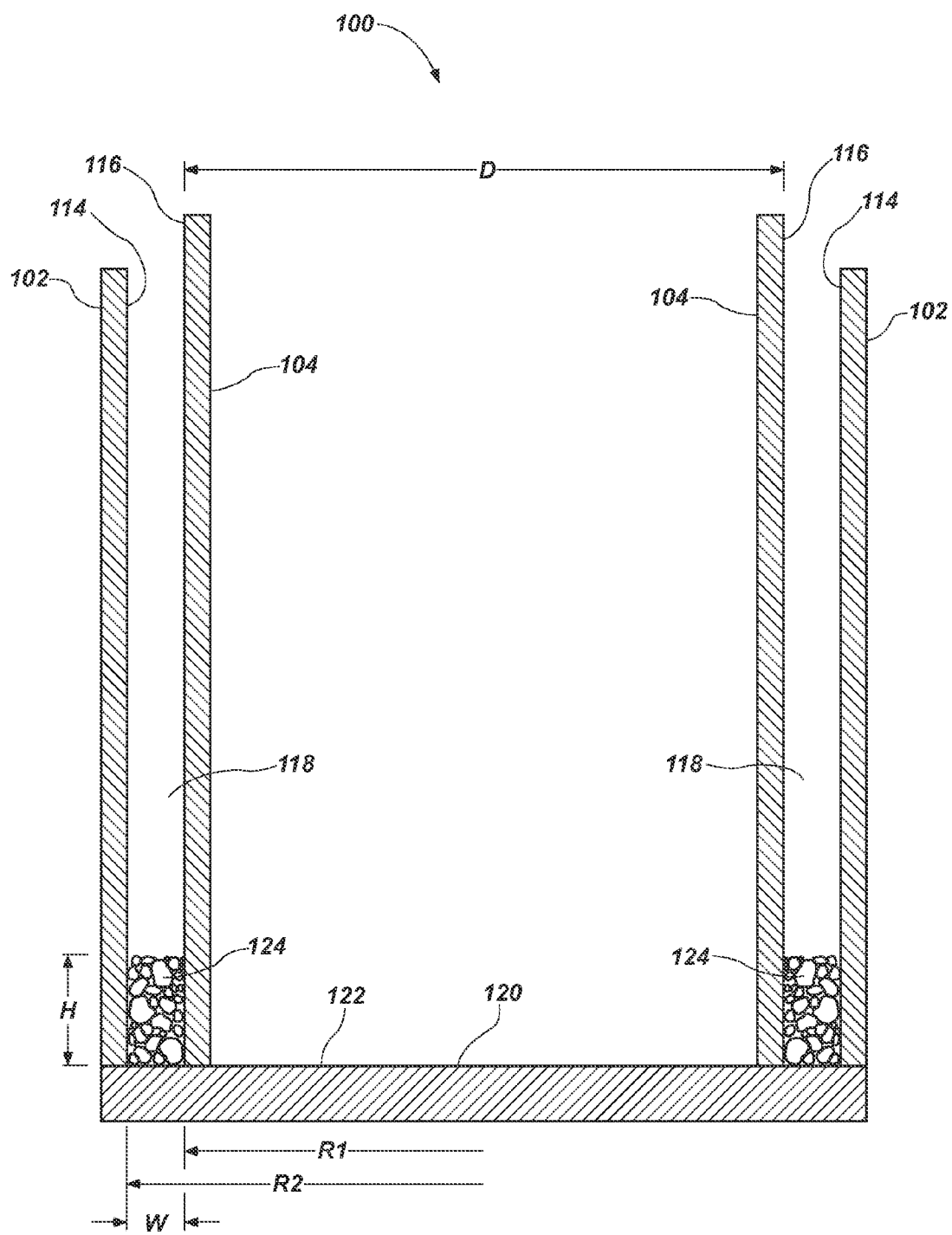
FIG. 2 is a cross-sectional view of the mold depicted in FIG. 1 with a layer of aggregate deposited therein.

Referring now to FIG. 2, there is depicted a cross-sectional view of the mold 100 taken along the section A-A shown in FIG. 1 mounted on a base member 120. An inner surface 114 of the outer mold 102 and an outer surface 116 of the inner mold 104 may be separated by a distance, W, sometimes referred to herein as a wall thickness. In an embodiment of the present disclosure, the wall thickness, W, may be between about two and ten inches. The inner surface 114 of the outer mold 102 and an outer surface 116 of the inner mold 104 and an upper surface 122 of the base member 120 may define a cavity 118. The cavity 118 may take the form of the desired resin-based structure as is known to one having ordinary skill in the art. An diameter inner diameter, D, of the mold may be between about ten inches and one hundred inches.

As can be observed in FIG. 2, a first step of forming a resin-based structure using the mold 100 may be to place a first layer of aggregate 124 in the cavity 118 and on top of the upper surface 122 of the base member 120. The first layer of aggregate 124 may extend upwardly from the upper surface 122 of the base member 120 to a predetermined height, H. The first layer of aggregate 124 may have a width, W. A total volume, V, of the first layer of aggregate 124 in the cavity 118 may be determined from its height, H, its width, W, as well as a radius R2 of the inner surface 114 of the outer mold 102 and a radius R1 of the outer surface 116 of the inner mold 104. The first layer of aggregate 124 may be placed into the mold 100 by hand or by an automated process.

Figure 3:
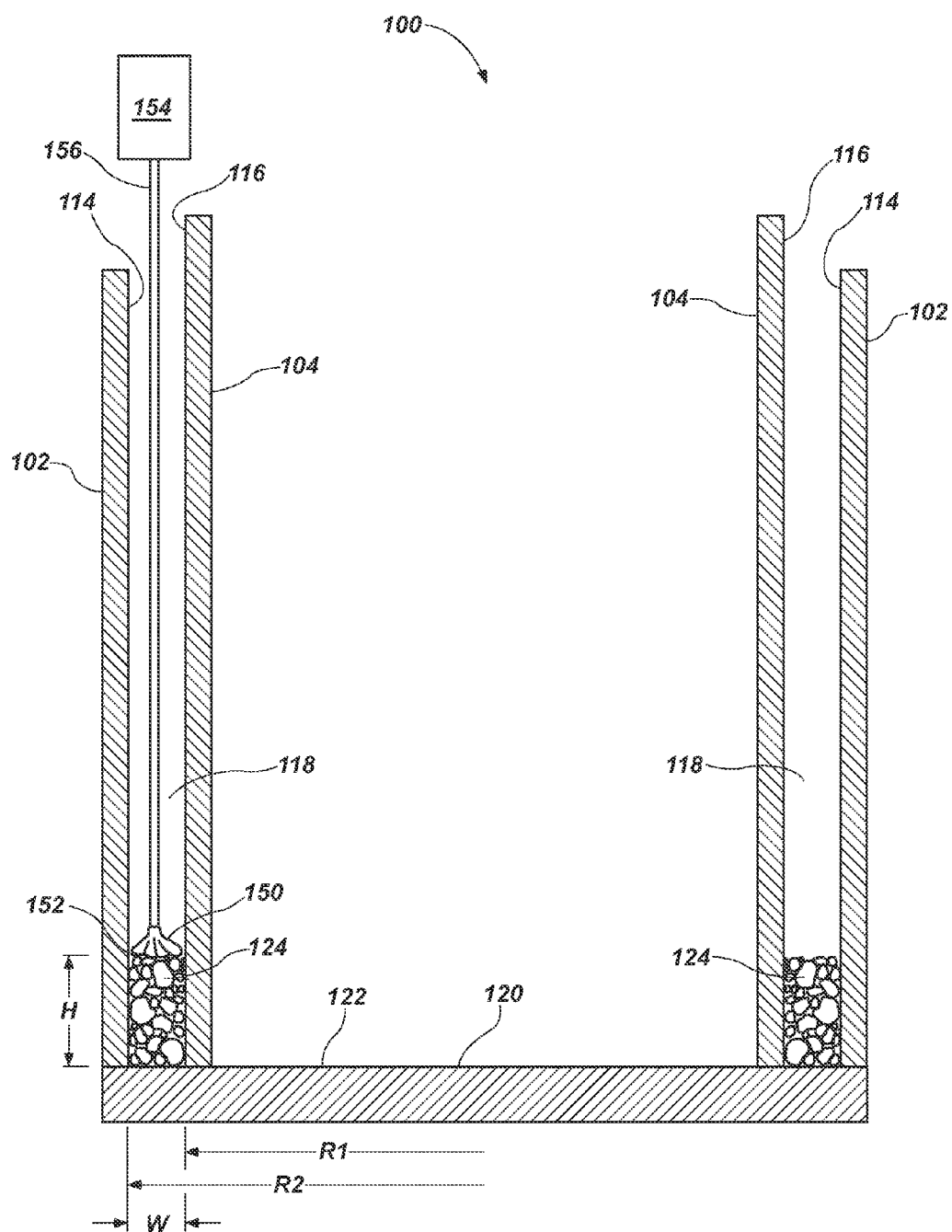
FIG. 3 is a cross-sectional view of the mold depicted in FIG. 1 with a layer of aggregate deposited therein further showing resin being deposited on the top of the layer of aggregate.

Once the first layer of aggregate 124 is in place in the mold 100, a resin 150 may be directed from a supply 154 through a guide 156 and then onto a top surface 152 of the first layer of aggregate 124 as shown in FIG. 3. It will be appreciated that the resin 150 may briefly accumulate on the top surface 152 of the aggregate 124. The application of the resin 150 may be accomplished by hand or by an automated process. The resin 150 may be applied to the entire top surface 152 of the first layer of aggregate 124. Once in place, the resin 150 may be allowed to gravity feed from the top surface 152 of the first layer of aggregate 124 to the upper surface 122 of the base member 120.

Figure 4:
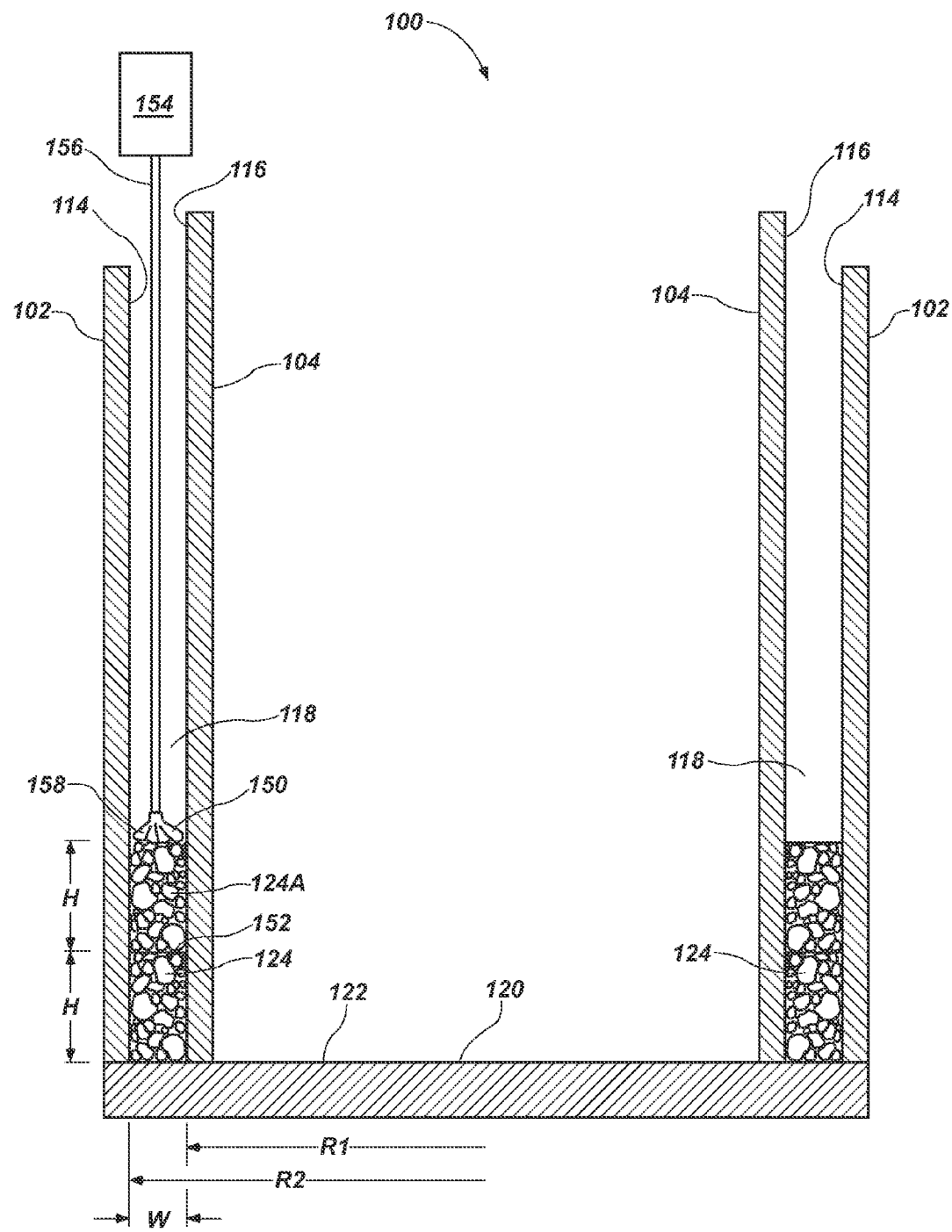
FIG. 4 is a cross-sectional view of the mold depicted in FIG. 1 with stacked layers of aggregate deposited therein further showing resin being deposited on the top of the uppermost layer of aggregate.

As shown in FIG. 4, the resin 150 applied to the top surface 152 of the first layer of aggregate 124 may gravity feed to the upper surface 122 of the base member 120. A second layer of aggregate 124A may then be placed onto the top surface 152 of the first layer of aggregate 124. Resin 150 from the supply 154 may be directed by the guide 156 onto a top surface 158 of the second layer of aggregate 124A. It will be appreciated that the resin 150 may briefly accumulate on the top surface 158 of the aggregate 124A. The resin 150 may be applied to the entire top surface 158 of the second layer of aggregate 124A.

Figure 5:
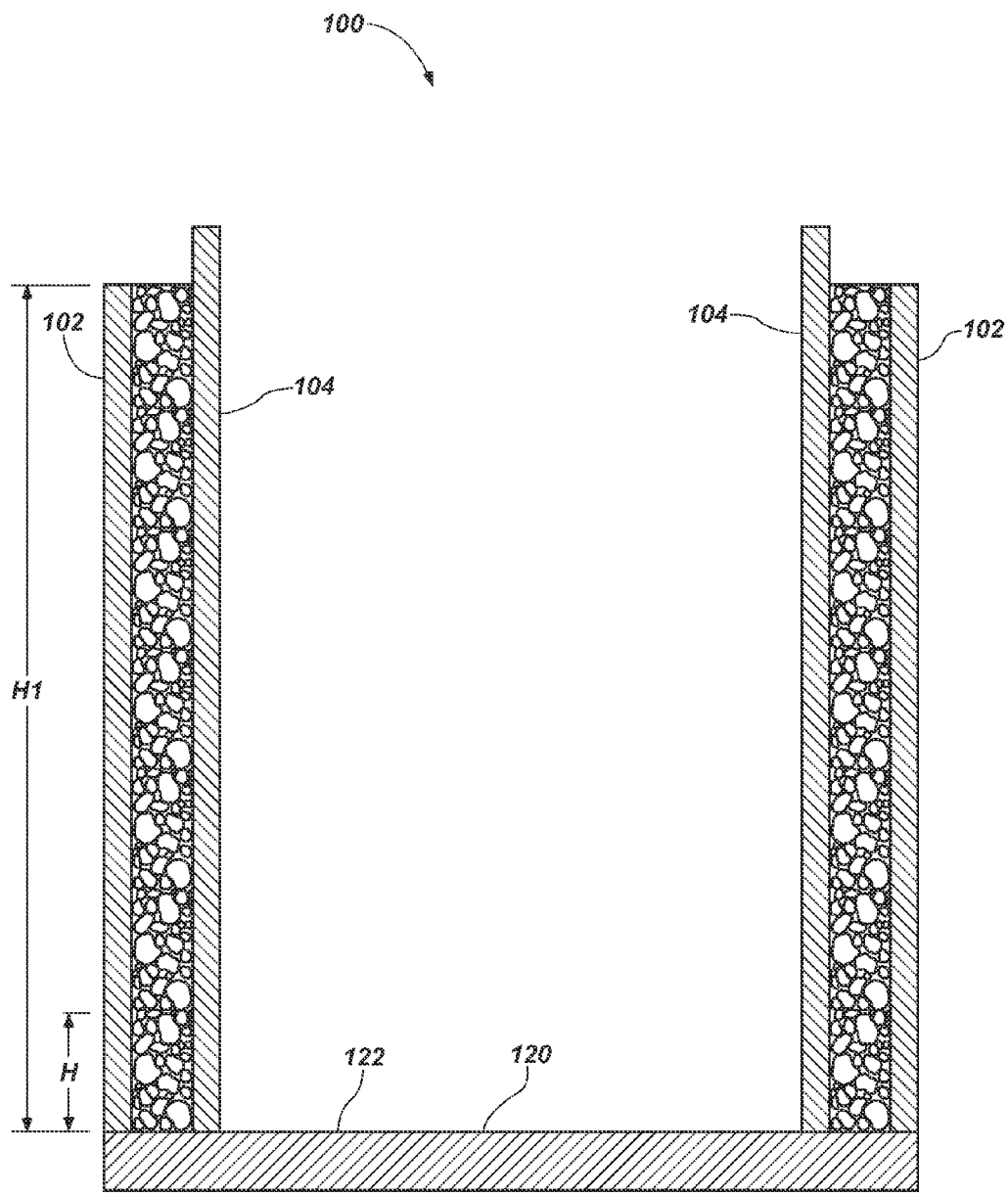
FIG. 5 is a cross-sectional view of the mold depicted in FIG. 1 with stacked layers of aggregate filled to the top of the mold.

Once in place, the resin 150 may gravity feed from the top surface 158 of the second layer of aggregate 124A to the top surface 152 of the first layer of aggregate 124. It will be appreciated that the above described process may then be repeated as many times as necessary until the layers of aggregate reach the top of the mold 100 as shown in FIG. 5. Once the mold 100 is filled to a desired level, the resin 150 and aggregate mixture may then be allowed to cure for a period of time before removal of the mold 100.

Figure 6:
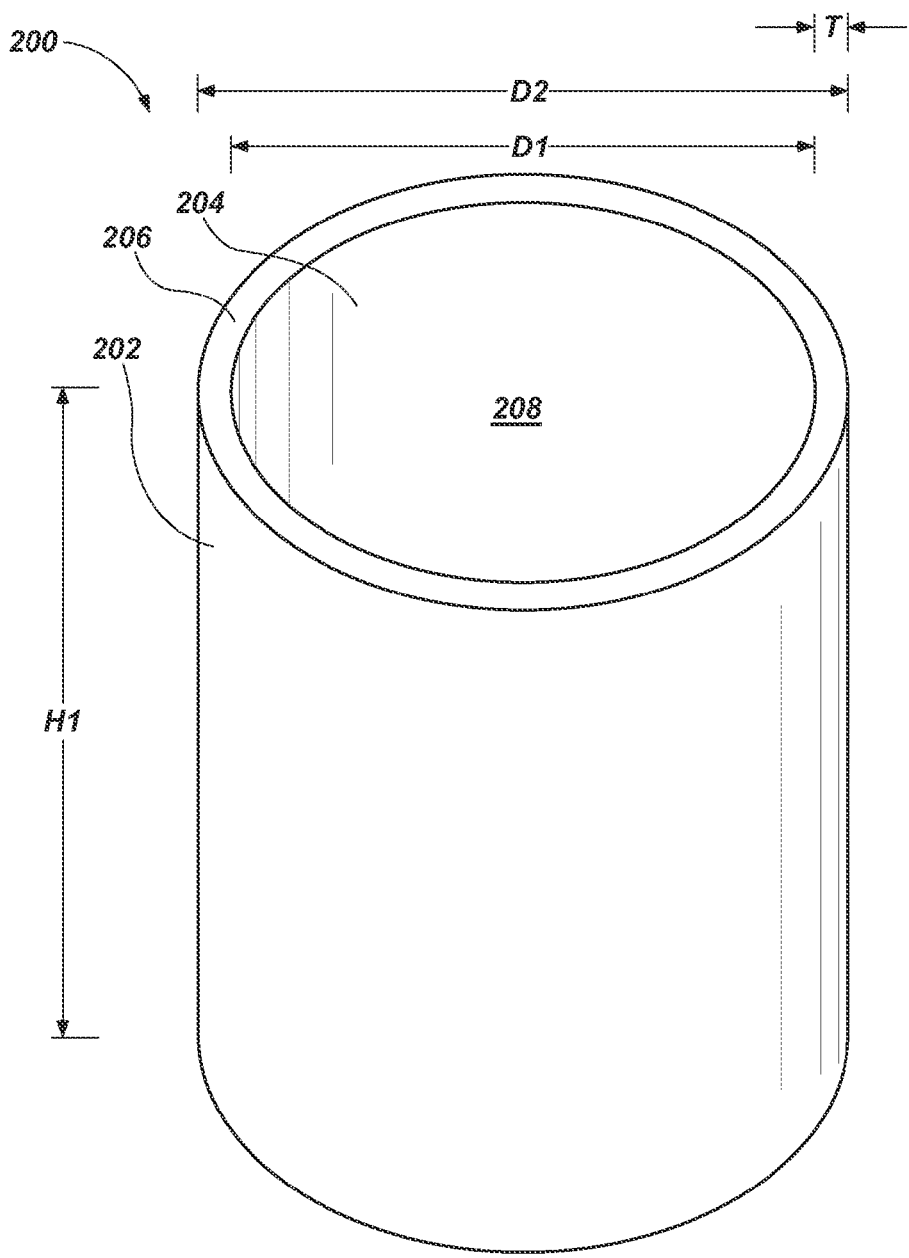
FIG. 6 is a perspective view of a resin-based structure formed by the mold depicted in FIG. 1.

Referring now to FIG. 6, there is depicted a resin-based structure 200 that may be formed by the mold 100. In an embodiment, the resin-based structure 200 may be used as a riser in a manhole assembly. The structure 200 may have a height, H1. As can be observed, the structure 200 may have a generally cylindrical shape having an outer diameter, D2. The structure 200 may comprise an outer surface 202 and an inner surface 204. The outer surface 202 and the inner surface 204 may be separated by a surface 206. The inner surface 204 may form a hollow passageway 208 in the structure 200 having an inner diameter, D1. A distance between the outer surface 202 and the inner surface 204 may be a wall thickness, T. Multiple structures 200 may be joined end-to-end to form a fluid pathway. A lap joint (not explicitly shown) may be utilized to interconnect multiple structures 200 end-to-end.

Figure 7:
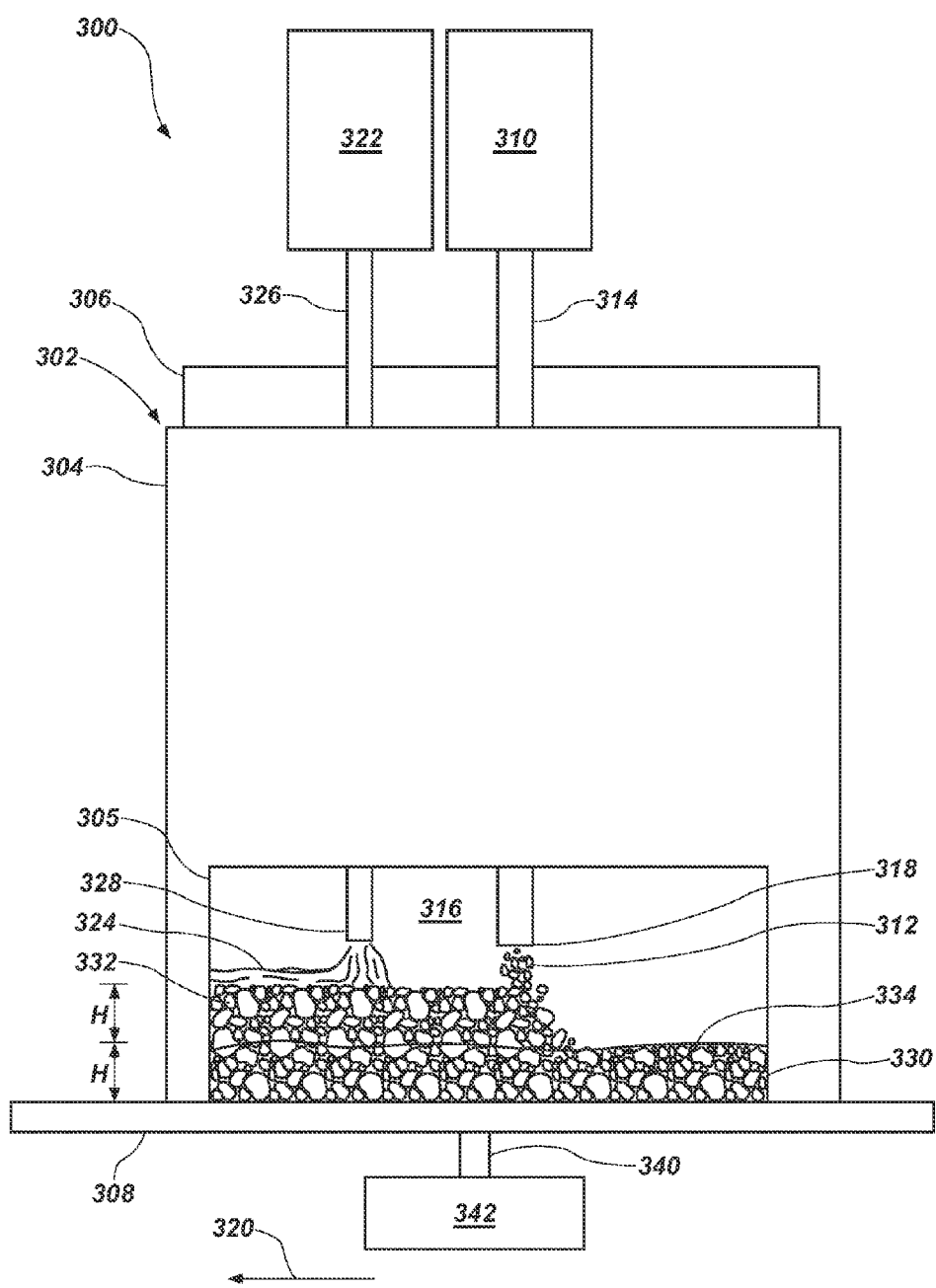
FIG. 7 depicts a process for forming a resin-based structure in a mold pursuant to an embodiment of the present disclosure.

Referring now to FIG. 7, there is depicted a system 300 for forming a resin-based structure. The system 300 may comprise a mold 302. The mold 302 may comprise an outer mold 304 and an inner mold 306. It will be appreciated that the mold 302 may take virtually any size or shape. The mold 302 may be manufactured to any shape and size to meet any specification required. In an embodiment of the present disclosure, the mold 302 may be utilized to form a structure with an opening and detachable cover that gives access to an enclosed area, such as a sewer, drain or tank. In an embodiment of the present disclosure, the mold 302 may be utilized to form a manhole for use in accessing a sewer, drain, or tank. In an embodiment of the present disclosure, the mold 302 may be utilized to form a pipe for use in an underground system for carrying sewage or water. In an embodiment of the present disclosure, the mold 302 may be utilized to form a vault structure. In an embodiment of the present disclosure, the mold 302 may be utilized to form a raceway for use in a sewage treatment plant. For purposes of convenience, a cutaway portion 305 of the outer mold 304 shows a cavity or space 316 between the outer mold 304 and the inner mold 306. (During operation, the cutaway portion 305 would not be present.)

In an embodiment of the present disclosure, the mold 302 may be mounted on a rotatable base member 308. The base member 308 may rotate around a central axis of the mold 302. For example, the base member 308 may be connected to a shaft 340 of a motor 342 that may rotate the base member 308 and the mold 302 in the direction indicated by an arrow marked with the reference numeral 320. In an embodiment of the present disclosure, the rate of revolution of the mold 302 may be controlled by controlling the speed of the motor 342. The motor 342 may be electric or hydraulic.

A hopper 310 may contain a supply of aggregate 312. An aggregate guide member 314 may extend from the hopper 310 to a terminal end 318 positioned in the cavity 316 between the outer mold 304 and the inner mold 306 of the mold 302. The aggregate guide member 314 may take the form of a chute, tube, channel, walls or any other structure for guiding aggregate into the mold 302. In an embodiment of the present disclosure, the aggregate guide member 314 may include a mechanized apparatus for moving aggregate. The mechanized apparatus may include a conveyor belt or auger. In an embodiment of the present disclosure, the flow of aggregate through the aggregate guide member 314 may be controlled such that the aggregate is deposited into the mold 302 at a predetermined rate. For example, an aperture (not shown) may control the flow of aggregate from the hopper 310.

The aggregate guide member 314 may allow aggregate 312 to be directed into the cavity 316. The flow of aggregate 312 through the aggregate guide member 314 may be constant or varied. In an embodiment of the present disclosure, the flow of aggregate 312 through the aggregate guide member 314 may be controllable. A reservoir 322 may contain a supply of resin 324. A resin guide member 326 may extend from the reservoir 322 to a terminal end 328 positioned in the cavity 316 between the outer mold 304 and the inner mold 306. In an embodiment of the present disclosure, the resin guide member 326 may comprise a tube, channel, passage way, walls or a spout.

The resin guide member 326 may allow resin 324 to be directed into the cavity 316. The flow of resin 324 through the resin guide member 326 may constant or varied. In an embodiment of the present disclosure, the flow of resin 324 through the resin guide member 326 may be controllable. The aggregate guide member 314 may be positioned in front of the resin guide member 326 with respect to the direction of rotation of the mold 302. Further, the vertical height of the terminal ends 318 and 328 of the guides 314 and 326, respectively, may be adjustable. That is, as the height of the layers of aggregate 312 accumulate in the mold, the terminal ends 318 and 328 may be raised. Alternatively, the entire mold 302 may be lowered.

A process of forming a resin-based structure using the system 300 will now be explained. At startup, the mold 302 may be placed in rotation at a constant rate in the direction shown by the arrow marked with the reference numeral 320. Alternatively, one or both of the guides 314 and 326 may be placed in rotation. In either case, the mold 302 is placed in movement relative to the guides 314 and 326. The terminal ends 318 and 328 of the guides 314 and 326, respectively, may then be positioned inside of the cavity 316.

Once the mold 302 is rotating, a continuous flow of aggregate 312 from the hopper 310 may commence to begin forming the first layer in the bottom of the mold 302. A continuous flow of resin 324 from the reservoir 322 may also then commence. The resin 324 may be deposited on top of the first layer. The resin 324 may flow at a predetermined rate.

At the time shown in FIG. 7, a first layer of aggregate 330 with resin 324 has already been laid in the bottom of the mold 302. A second layer of aggregate 332 with resin 324 is shown in the process of getting laid on a surface 334 of the first layer of aggregate 330. Each of the layers of aggregate 312 in the mold 302 may have a height, H. The rate of flow of aggregate 312 may be adjusted to obtain any desired height, H. Alternatively, the rate of rotation of the mold 302 may also be varied to obtain any desired height, H. The above-described process may continue by creating a continuous, stacked and spiraling upward layer of aggregate 312 and resin 324 in the mold 302 until the aggregate 312 and resin 324 mixture reach the top of the mold 302.

It will be appreciated that, in an embodiment of the present disclosure, the mold 302 may be held motionless while the guide members 314 and 326 are moved relative to the mold 302. In an embodiment of the present disclosure, both the guide members 314 and 326 and the mold 302 may be moved.

It will be further appreciated that the above-described process may be adapted for non-circular molds, such a rectangular and square molds. For example, in an embodiment of the present disclosure, a mold, or aggregate and resin supply guides, or both, may be moved in a pre-set pattern to generate multiple and stacked layers of a mixture of aggregate and resin. In an embodiment of the present disclosure, the mold 302 may be a vacuum tight mold such that the resin is drawn through the aggregate using a vacuum source. In an embodiment of the present disclosure, the mold 302 may not be a vacuum mold.

Referring now to FIGS. 1-7, pursuant to an embodiment of the present disclosure, the height, H, of each layer of aggregate deposited in the molds 100 and 302 may be between about a half of an inch, or one inch, to about ten inches. In an embodiment of the present disclosure, the height, H, of each layer of aggregate in the molds 100 and 302 and may be about one to three inches. In an embodiment of the present disclosure, the height, H, of each layer of aggregate in the molds 100 and 302 and may be about two inches.

In an embodiment of the present disclosure, the resin-based structure formed by the molds 100 and 302 may have a height or length, H1, formed by the stacked layers of aggregate, each having a height, H, as shown in FIG. 5. In an embodiment of the present disclosure, the height or length, H1, may be between about six feet to fifteen feet. A ratio of the height, H, of a layer of aggregate to the height of the overall resin-based structure, H1, may be less than about 3% or 5%. In an embodiment of the present disclosure, a ratio of the height, H, of a layer of aggregate to the height, H1, of the overall resin-based structure may be less than about 2%.

In an embodiment of the present disclosure, a ratio of the height, H, of a layer of aggregate to the height, H1, of the overall resin-based structure may be less than about 1%.

In an embodiment of the present disclosure, it will be appreciated that a constraint on the height, H, of each layer of aggregate placed in the molds 100 and 302 may be determined based upon the viscosity of the resin. In particular, at some point, the height, H, of a layer of aggregate is too tall such that the resin will not gravity feed completely through a height, H, of a layer of aggregate. This may be undesirable as it may create a weakness in the resulting structure.

In an embodiment of the present disclosure, a suitable aggregate for use in creating a resin-based structure may include inert granular materials, such as sand, gravel, or crushed stone. A suitable aggregate may include both fine aggregates and coarse aggregates. In an embodiment of the present disclosure, a suitable aggregate may have minimal inert materials smaller than about 300 nanometers. In an embodiment of the present disclosure, a suitable aggregate may have minimal inert materials smaller than about 400 nanometers. In an embodiment of the present disclosure, a suitable aggregate may have minimal inert materials smaller than about 500 or 550 nanometers. In an embodiment of the present disclosure, a suitable aggregate may have minimal inert materials smaller than about 600 nanometers. In an embodiment of the present disclosure, a suitable aggregate may have minimal inert materials smaller than about 700 nanometers. As used herein, the term "minimal" may mean 0%, less that 1%, less than 5%, less than 10%, or less than between about 1% to 10%.

In an embodiment of the present disclosure, a suitable aggregate may have inert materials all larger than about 400 to 600 nanometers. In an embodiment of the present disclosure, a suitable aggregate may have inert materials all larger than about 550 nanometers. In an embodiment of the present disclosure, a suitable aggregate may have inert materials all larger than about 600 nanometers.

In an embodiment of the present disclosure, the aggregate may account for between 70-95% of the volume of a resin-based structure. In an embodiment of the present disclosure, the aggregate may account for approximately 80-90% of the volume of a resin-based structure. In an embodiment of the present disclosure, the aggregate may account for approximately 85% of the volume of a resin-based structure.

In an embodiment of the present disclosure, the resin may be a polymer resin or a monomer resin. In an embodiment of the present disclosure, the resin may have a low viscosity, similar to that of water, such that the resin may percolate or gravity flow through a layer of aggregate. A suitable resin for use with the present disclosure may be an infusion resin. A suitable resin may be of a thermal-set type.

In an embodiment of the present disclosure, the resin may account for between 5-30% of the volume of a resin-based structure. In an embodiment of the present disclosure, the resin may account for approximately 10-20% of the volume of a resin-based structure. In an embodiment of the present disclosure, the resin may account for approximately 15% of the volume of a resin-based structure. The amount of resin applied to a layer of aggregate may be determined from the foregoing to thereby maintain a desired volume of resin in a resin-based structure.

In an embodiment of the present disclosure, the volume of resin deposited on top of a single layer of aggregate may be between about 5% to 30% of the volume of the layer of aggregate. In an embodiment of the present disclosure, the volume of resin deposited on top of a layer of aggregate may be between about 10% to 20% of the volume of the layer of aggregate. In an embodiment of the present disclosure, the volume of resin deposited on top of a layer of aggregate may be about 15% of the volume of the layer of aggregate.

In an embodiment of the present disclosure, a resin-based structure created by a process disclosed herein may have a compressive strength of about 8,000-15,000 PSI, a tensile strength of about 1,500-5,000 PSI, and a bending strength of about 2,000-4,000 PSI.

It will be appreciated by those having skill in the art, that the present disclosure may be adapted to form various resin-based structures using molds of various size, shapes and configurations. In an embodiment of the present disclosure, a resin-based structure may be formed by adding an aggregate and a resin separately into a mold. In an embodiment of the present disclosure, aggregate may be placed into a mold in stacked layers having predetermined thicknesses. Resin may be poured or injected onto each layer of aggregate prior to the subsequent layer of aggregated being stacked on top of it. A continuous pour of layers of aggregate and resin may allow structures of extended length to be formed.

Figure 8:
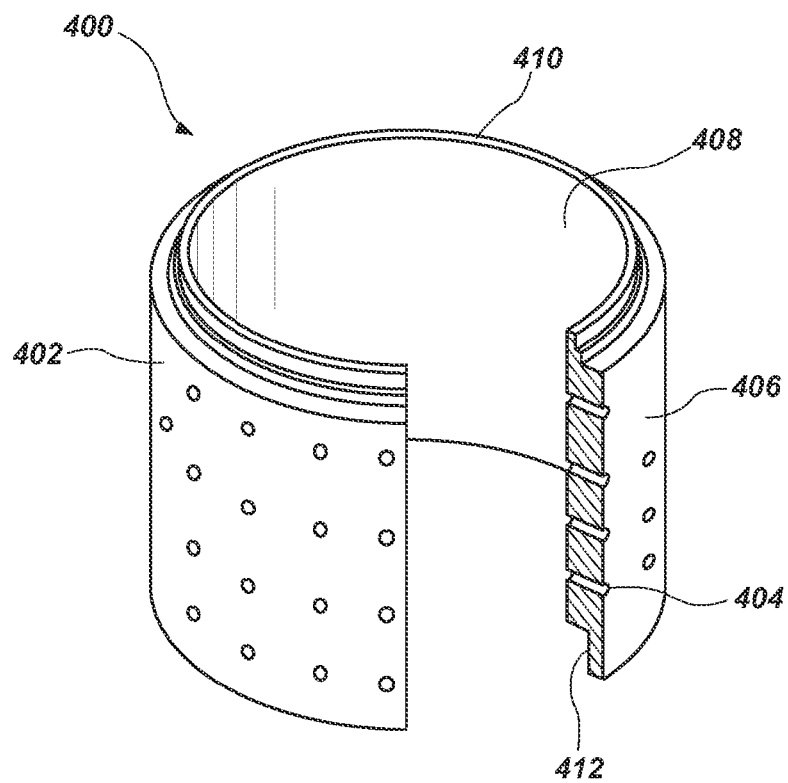
FIG. 8 is a perspective and fragmentary view of a resin-based structure formed pursuant to an embodiment of the present disclosure.

Referring now to FIGS. 8-16, there are depicted various resin-based structures that may be formed in accordance with the present disclosure. Referring now to FIG. 8, there is depicted a fragmentary view of a resin-based structure 400 taking the form of a perforated manhole section 402. The perforated manhole section 402 may include perforations 404 that extend from an outer surface 406 to an inner surface 408. The perforated manhole section 402 may include a tongue 410 extending from one end and a groove 412 on the other end. It will be appreciated that the tongue 410 and the groove 412 allow multiple perforated manhole sections 402 to be stacked end-to-end using lap joint type connections. The perforated manhole section 402 may be formed in a mold where the aggregate and resin are added to the mold separately and in stacked layers as described above.

Figure 9:
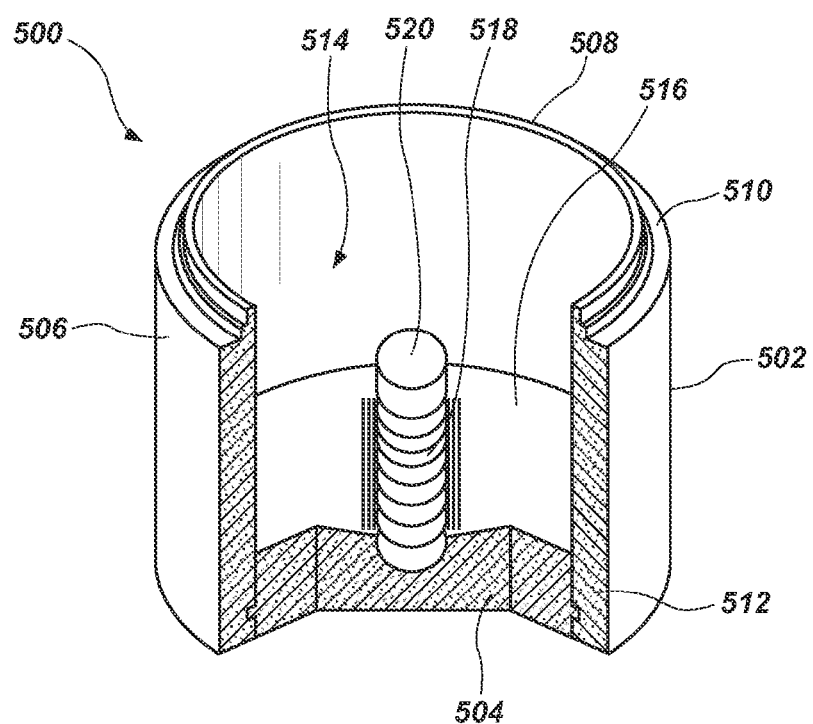
FIG. 9 is a perspective and fragmentary view of a resin-based structure formed pursuant to an embodiment of the present disclosure.

Referring now to FIG. 9, there is depicted a fragmentary view of a resin-based structure 500 taking the form of a manhole base 502. The manhole base 502 may include a bottom member 504 and a cylindrical sidewall 506. The bottom member 504 may close a lower end 512 of a hollow passage 514 formed by the sidewall 506. The sidewall 506 may include a tongue 508 extending from its top end 510. It will be appreciated that the tongue 508 may interlock with a groove in another member. A top surface 516 of the bottom member 504 may include a depression 518. The sidewall 506 may include openings 520 (only one visible) in alignment with the depression 518. The manhole base 502 may be formed in a mold where the aggregate and resin are added to the mold separately and in stacked layers as described above.

Figure 10:
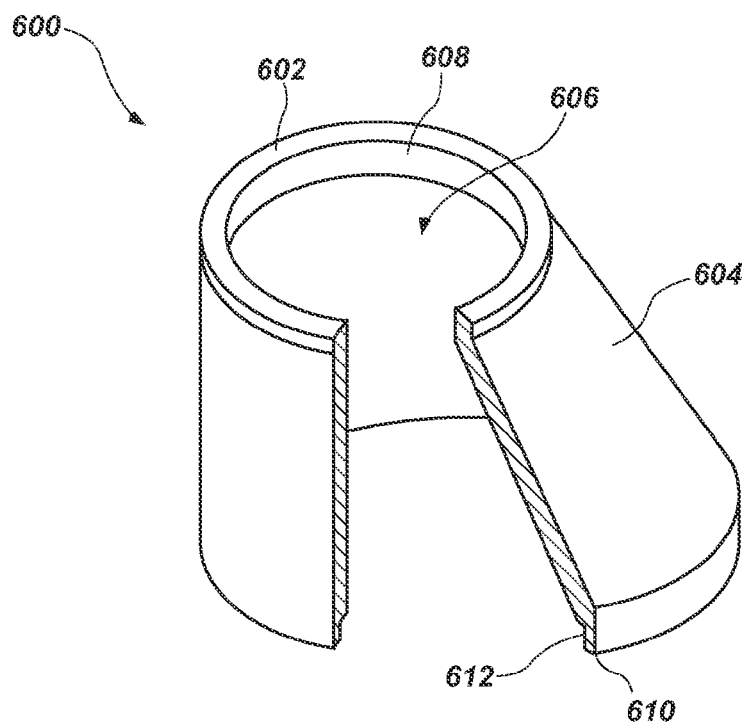
FIG. 10 is a perspective and fragmentary view of a resin-based structure formed pursuant to an embodiment of the present disclosure.

Referring now to FIG. 10, there is depicted a fragmentary view of a resin-based structure 600 taking the form of an eccentric manhole cone 602. The manhole cone 602 may include an eccentric cone portion 604. A hollow passage 606 may extend from a top opening 608 to a bottom opening 610. A groove 612 may be formed in the bottom opening 610 for interlocking with a tongue of another member. The manhole cone 602 may be formed in a mold where the aggregate and resin are added to the mold separately and in stacked layers as described above.

Figure 11:
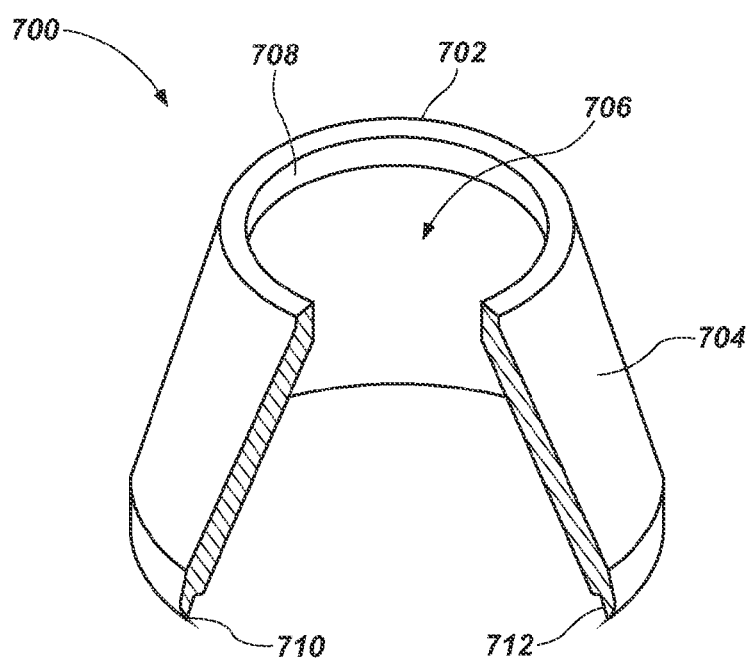
FIG. 11 is a perspective and fragmentary view of a resin-based structure formed pursuant to an embodiment of the present disclosure.

Referring now to FIG. 11, there is depicted a fragmentary view of a resin-based structure 700 taking the form of an concentric manhole cone 702. The manhole cone 702 may include a cone portion 704. A hollow passage 706 may extend from a top opening 708 to a bottom opening 710. A groove 712 may be formed in the bottom opening 710 for interlocking with a tongue of another member. The manhole cone 702 may be formed in a mold where the aggregate and resin are added to the mold separately and in stacked layers as described above.

Figure 12:
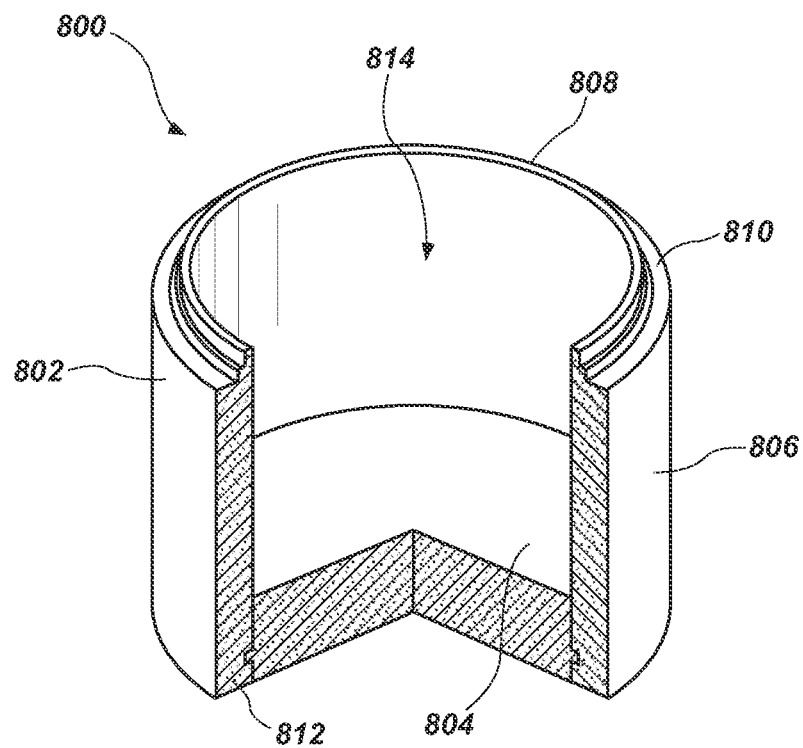
FIG. 12 is a perspective and fragmentary view of a resin-based structure formed pursuant to an embodiment of the present disclosure.

Referring now to FIG. 12, there is depicted a fragmentary view of a resin-based structure 800 taking the form of a manhole base 802. The manhole base 802 may include a bottom member 804 and a cylindrical sidewall 806. The bottom member 804 may close a lower end 812 of a hollow passage 814 formed by the sidewall 806. The sidewall 806 may include a tongue 808 extending from its top end 810. It will be appreciated that the tongue 808 may interlock with a groove in another member. The manhole base 802 may be formed in a mold where the aggregate and resin are added to the mold separately and in stacked layers as described above.

Figure 13:
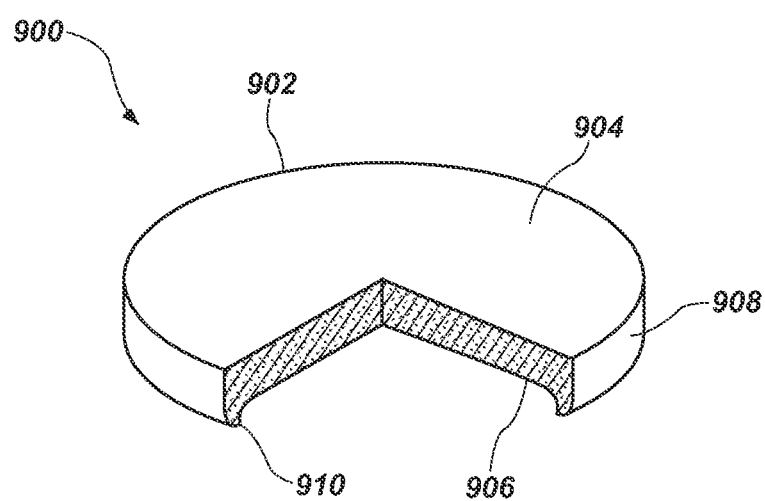
FIG. 13 is a perspective and fragmentary view of a resin-based structure formed pursuant to an embodiment of the present disclosure.

Referring now to FIG. 13, there is depicted a fragmentary view of a resin-based structure 900 taking the form of a manhole lid 902. The manhole lid 902 may be substantially disc shaped and include a top surface 904 and a bottom surface 906. The top surface 904 and the bottom surface 906 may be separated by a sidewall 908. A locking lip 910 may protrude downwardly from the bottom surface 906. The manhole lid 902 may be formed in a mold where the aggregate and resin are added to the mold separately and in stacked layers as described above.

Figure 14:
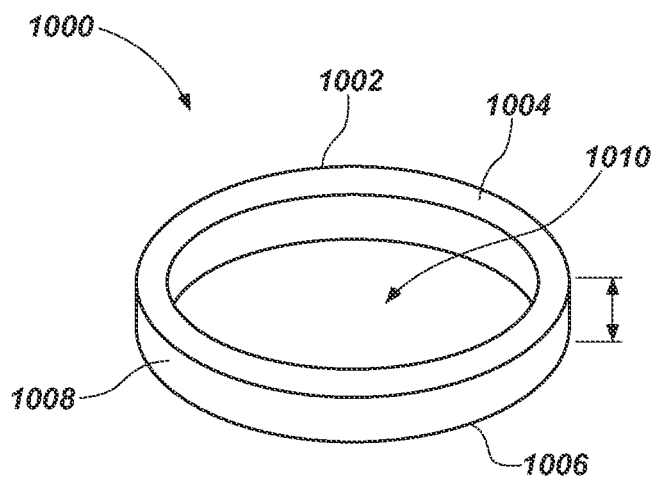
FIG. 14 is a perspective of a resin-based structure formed pursuant to an embodiment of the present disclosure.

Referring now to FIG. 14, there is depicted a view of a resin-based structure 1000 taking the form of a manhole ring 1002. The manhole ring 1002 may be substantially disc shaped and include a top surface 1004 and a bottom surface 1006. The top surface 1004 and the bottom surface 1006 may be separated by a sidewall 1008. A hollow passage 1010 may be formed in the ring 1002. The ring 1002 may be formed in a mold where the aggregate and resin are added to the mold separately and in stacked layers as described above.

Figure 15:
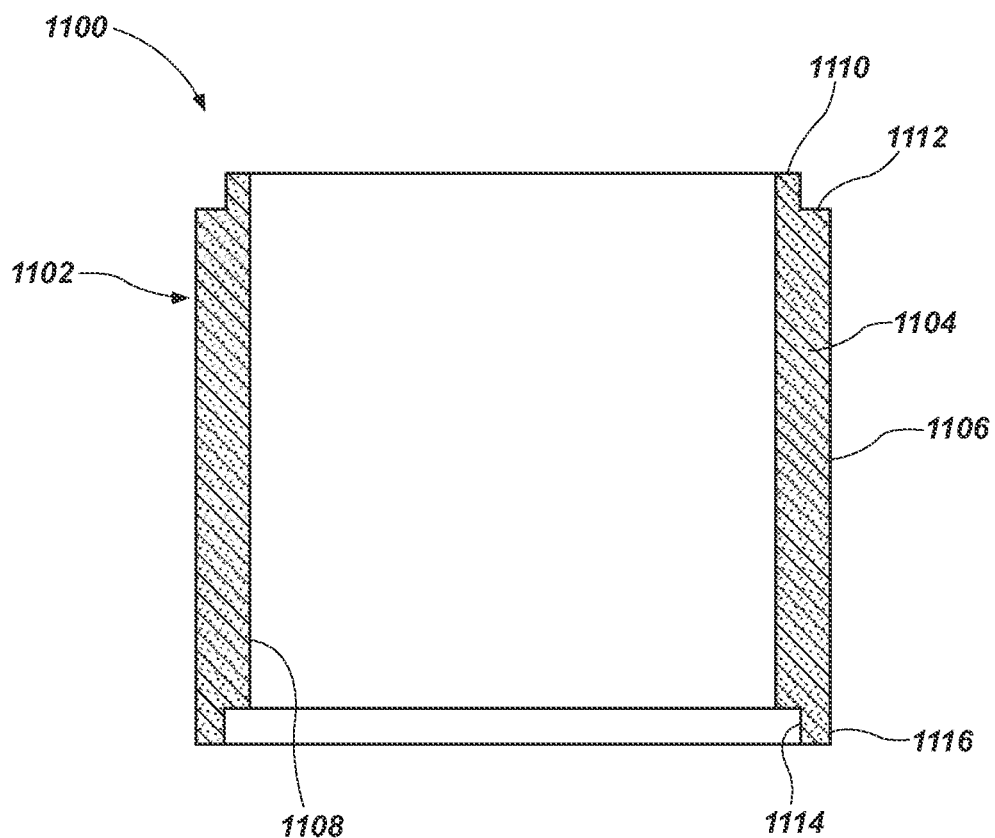
FIG. 15 is a cross-sectional view of a resin-based structure formed pursuant to an embodiment of the present disclosure.

Referring now to FIG. 15, there is depicted a section view of a resin-based structure 1100 taking the form of a manhole riser 1102. The riser 1102 may include a sidewall 1104 having an outer surface 1106 and an inner surface 1108. The riser 1102 may include a tongue 1110 extending from a top end 1112 and a groove 1114 formed in a bottom end 1116. It will be appreciated that the tongue 1110 and the groove 1114 may allow multiple risers 1102 to be stacked end-to-end using lap joint type connections. The riser 1102 may be formed in a mold where the aggregate and resin are added to the mold separately and in stacked layers as described above.

Figure 16:
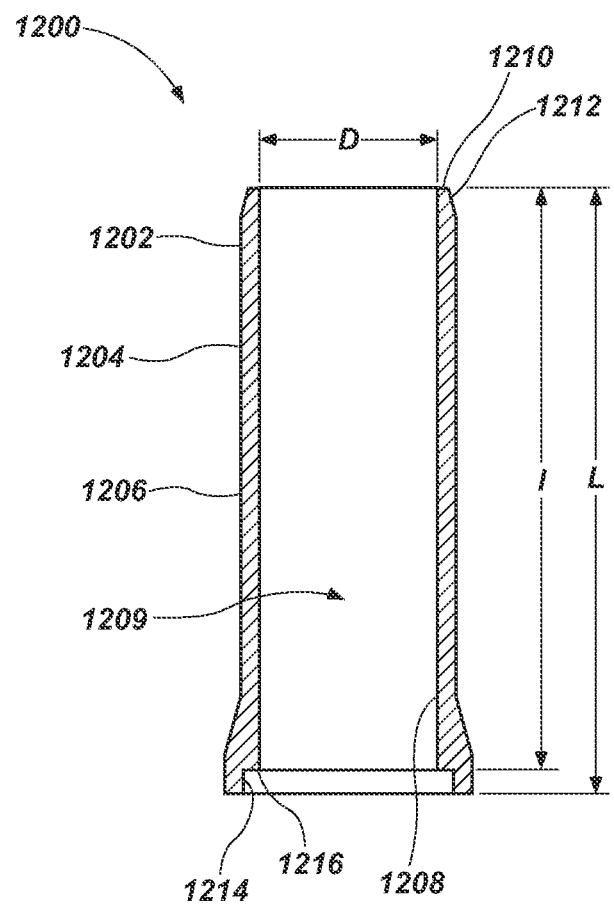
FIG. 16 is a cross-sectional view of a resin-based structure formed pursuant to an embodiment of the present disclosure.

Referring now to FIG. 16, there is depicted a section view of a resin-based structure 1200 taking the form of a pipe 1202. The pipe 1202 may include a sidewall 1204 having an outer surface 1206 and an inner surface 1208. The inner surface 1208 may define a hollow passageway 1209 through the pipe 1202. The pipe 1202 may include a tongue 1210 extending from a top end 1212 and a groove 1214 formed in a bottom end 1216. It will be appreciated that the tongue 1210 and the groove 1214 may allow multiple pipes 1202 to be stacked end-to-end using lap joint type connections. A diameter, D, and a length, L, of the pipe 1202 may vary. The pipe 1202 may be formed in a mold where the aggregate and resin are added to the mold separately and in stacked layers as described above. In an embodiment of the present disclosure, the length, L, of the pipe 1202 may be between about six feet and twenty feet. In an embodiment of the present disclosure, the diameter, D, of the pipe 1202 may be between about ten inches and one hundred inches and the wall thickness between the outer surface 1206 and an inner surface 1208 of the sidewall 1204 may be between about two inches and ten inches.

Figure 17:
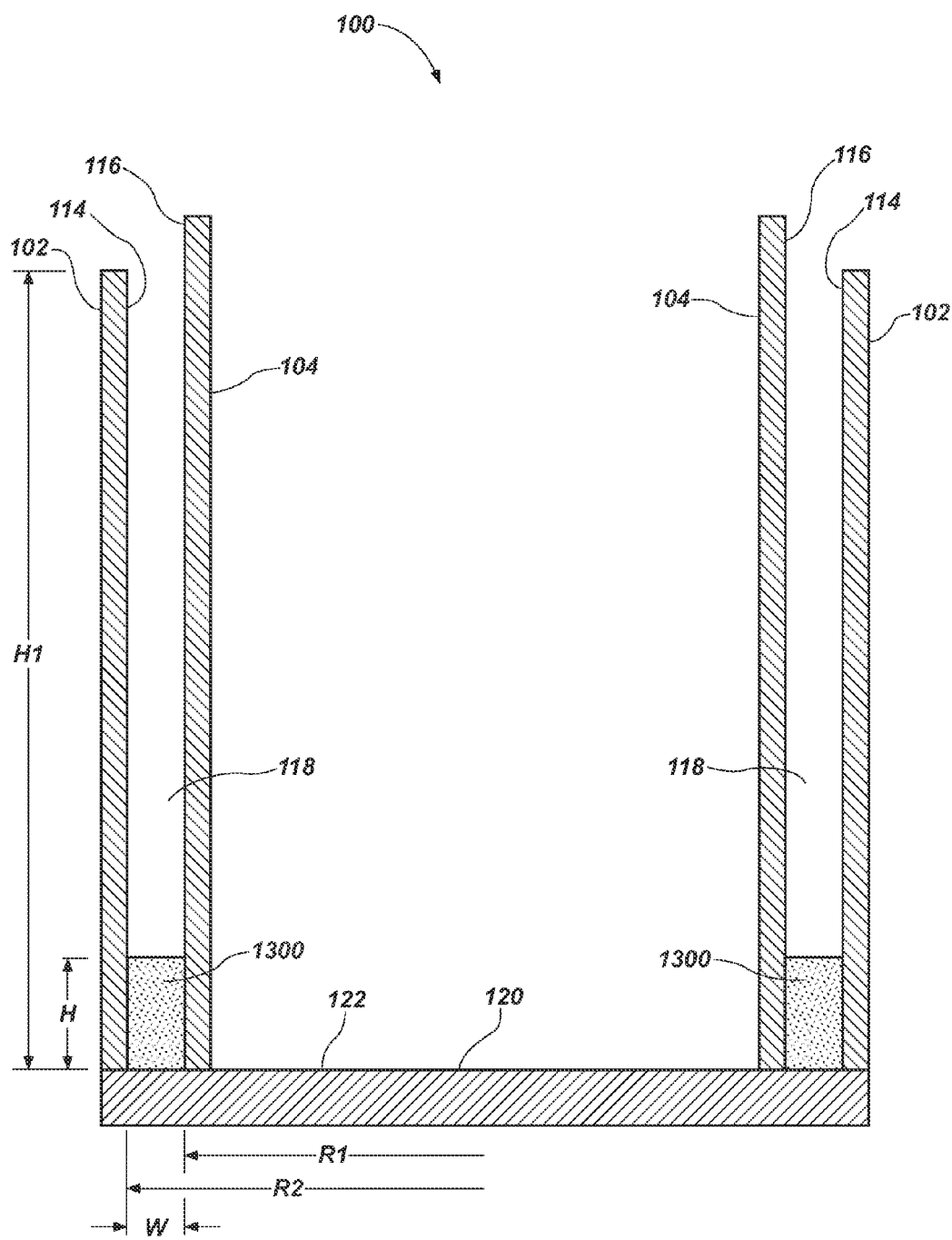
FIG. 17 is a cross-sectional view of the mold depicted in FIG. 1 with resin deposited therein.

Referring now to FIG. 17, there is depicted a method of forming a polymer concrete structure using the mold 100 pursuant to an embodiment of the present disclosure, where like reference numerals indicate like components. In contrast to the procedure described in relation to FIGS. 2-7, as shown in FIG. 17, a resin 1300 is first poured into the mold 100. The amount of resin 1300 poured into the mold 100 may comprise a sufficient amount for forming the structure. For example, in an embodiment of the present disclosure, the resin 1300 poured initially into the mold 100 may account for between 5-30% of the volume of a resin-based structure formed by the mold 100. In an embodiment of the present disclosure, the resin 1300 may account for approximately 10-20% of the volume of a resin-based structure formed by the mold 100. In an embodiment of the present disclosure, the resin 1300 may account for approximately 15% of the volume of a resin-based structure formed by the mold 100.

Figure 18:
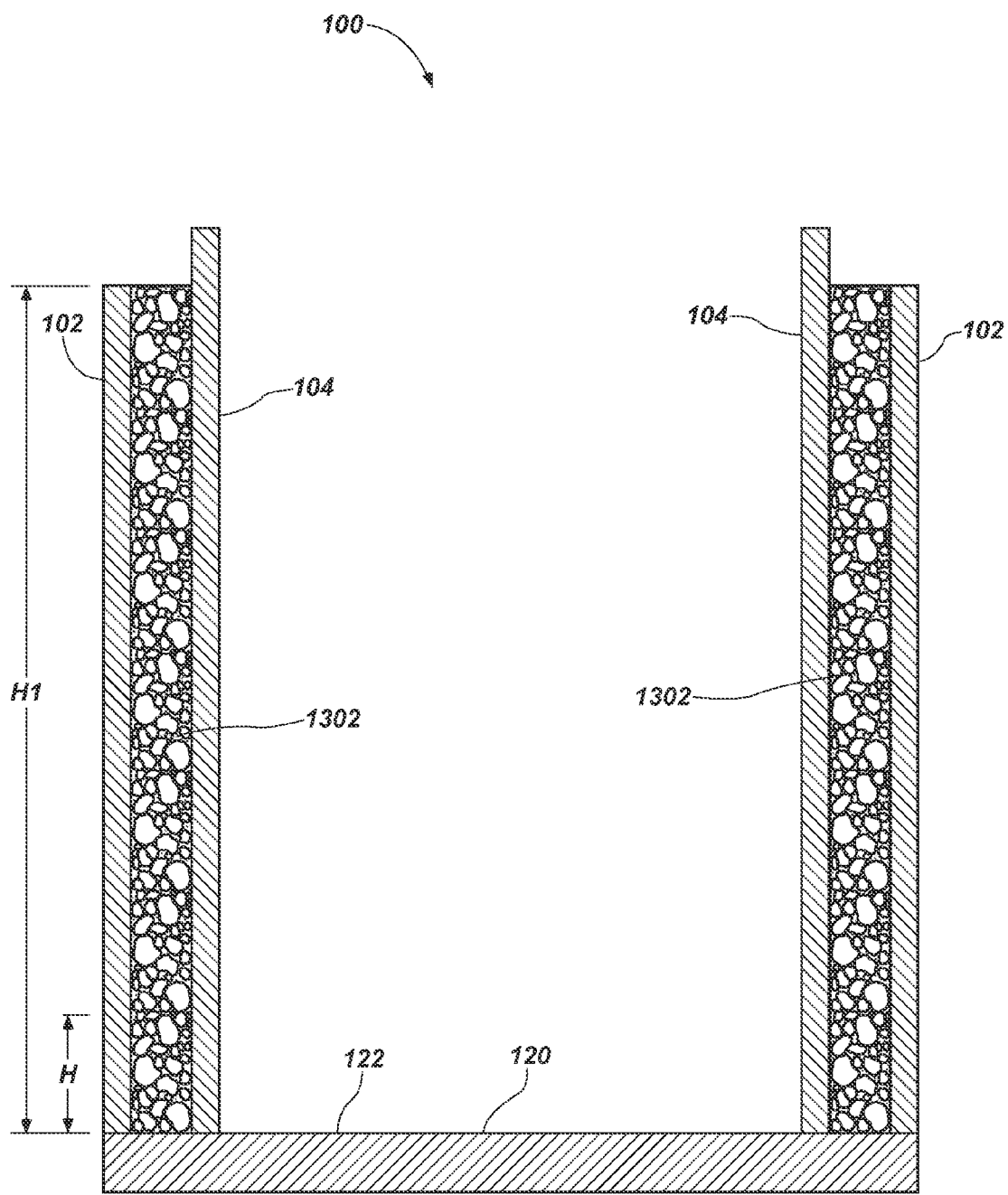
FIG. 18 is a cross-sectional view of the mold depicted in FIG. 17 with aggregate deposited therein.

Referring now to FIG. 18, once a desired amount of resin 1300 has been placed into the mold 100, aggregate 1302 may be placed into the mold 100 on top of the resin 1300. The resin 1300 may flow upwards through the aggregate 1302. In an embodiment of the present disclosure, the aggregate 1302 may fill to the top of the mold 100. In an embodiment of the present disclosure, the aggregate 1302 may be placed into the mold 100 in lifts. In an embodiment of the present disclosure, the aggregate 1302 may account for between 70-95% of the volume of a resin-based structure formed by the mold 100. In an embodiment of the present disclosure, the aggregate 1302 may account for approximately 80-90% of the volume of a resin-based structure. In an embodiment of the present disclosure, the aggregate 1302 may account for approximately 85% of the volume of a resin-based structure. It will be appreciated that placing resin 1300 into the mold 100 separately from the aggregate 1302 precludes the need for pre-mixing the aggregate 1302 and the resin 1300. It will be further appreciated that placing substantially the entire amount of resin 1300 into the mold 100 first and then adding the aggregate 1302 eliminates the need for layering the aggregate 1302 and resin 1300 as described above.

Figure 19:
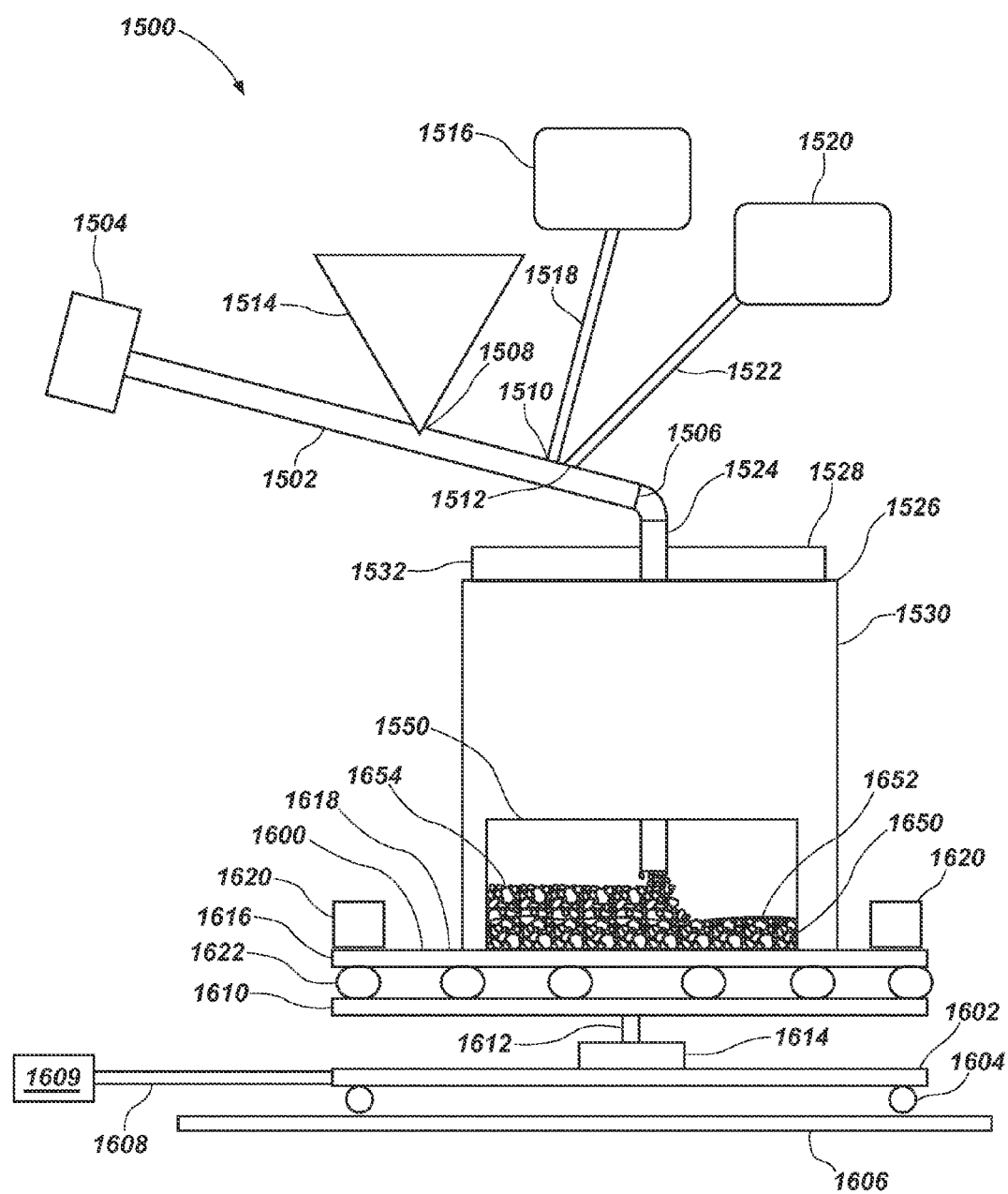
FIG. 19 is a diagram of a system for casting polymer concrete structure.

Referring now to FIG. 19, there is shown a system 1500 for casting polymer concrete structures, including structures for use in manhole assemblies, such as the structures shown in FIGS. 6 and 8-16. The system 1500 may include an elongated mixing tube 1502 having an auger (not visible) disclosed therein. The mixing tube 1502 may have a discharge end 1506 where an aggregate/resin mixture may be discharged. A motor 1504 for turning the auger may be disposed on an end of the mixing tube 1502 opposite the discharge end 1506. In an embodiment, the motor 1504 may be an electric motor. In an embodiment, the motor 1504 may be a hydraulic motor.

In an embodiment, the mixing tube 1502 may include an aggregate feeder port 1508, a resin feeder port 1510, and a catalyst feeder port 1512. A hopper 1514 may be connected to the aggregate feeder port 1508. In an embodiment, the hopper 1514 may be fed by one or more conveyors (not shown) that direct a coarse and a fine aggregate into the hopper 1514 at a predetermined rate. The aggregate directed into the hopper 1514 may gravity feed through the aggregate feeder port 1508 into the mixing tube 1502 where it is moved towards the discharge end 1506 by the turning of the auger.

In an embodiment, the system 1500 may further include a resin reservoir 1516. The resin reservoir 1516 may be connected to the resin feeder port 1510 by a resin supply tube 1518. In an embodiment, resin in the reservoir 1516 may be pumped or gravity fed into the resin feeder port 1510 where it enters into the mixing tube 1502. Once in the mixing tube 1502, the resin may be mixed with the aggregate by the auger to form a resin and aggregate mixture. In an embodiment, the resin feeder port 1510 may disposed on the mixing tube 1502 within 8 to 16 inches from the discharge end 1506. In an embodiment, the resin feeder port 1510 may disposed on the mixing tube 1502 at about 12 inches from the discharge end 1506.

In an embodiment, the system 1500 may further include a catalyst reservoir 1520. The catalyst reservoir 1520 may be connected to the catalyst feeder port 1512 by a catalyst supply tube 1522. In an embodiment, a catalyst in the reservoir 1520 may be pumped or gravity fed into the catalyst feeder port 1512 where it enters into the mixing tube 1502. Once in the mixing tube 1502, the catalyst may be mixed with the resin/aggregate mixture by the auger. In an embodiment, the auger moves the resin/aggregate/catalyst mixture in the mixing tube 1502 to the discharge end 1506 where it is directed by a snorkel 1524 into a mold 1526.

In an embodiment, the aggregate directed into the hopper 1514 may include a coarse aggregate and a fine aggregate. The coarse aggregate may comprise rocks. The fine aggregate may comprise #70 fine sift sand. In an embodiment, the resin reservoir 1516 may contain resin and pigments. The resin may include one or more of a polymer resin, a pure cast resin, a crushed glass resin, fiberglass, a composite material, plastic, and an inorganic material. The catalyst in the catalyst reservoir 1520 may include any substance that causes the resin to harden as is known to those having ordinary skill in the art.

The mold 1526 may take substantially the same form as mold 100 shown in FIG. 1 above. The mold 1526 may include an inner mold 1528 and an outer mold 1530. In an embodiment, the inner mold 1528 and the outer mold 1530 may be cylindrical in shape such that they may form a hollow cylindrical structure such as a riser portion of a manhole structure.

The inner mold 1528 and the outer mold 1530 may define mold space between them. In an embodiment, the width of the mold space may define a wall thickness of a polymer concrete structure formed by the mold 1526. Further, an outer surface 1532 of the inner mold 1528 may form an inner diameter of a polymer concrete structure formed by the mold 1526 while an inner surface of the outer mold 1530 may form an outer surface of the polymer concrete structure.

In an embodiment, the width of the mold space between the outer surface 1532 of the inner mold 1258 and the inner surface of the outer mold 1530 may be less than 1/12th of a diameter of the outer surface 1532 of the inner mold 1528. In an embodiment, the width of the mold space may be between one and three inches, or about two inches, or greater than about one-half of an inch.

In an embodiment, a structure formed by the mold 1532 may be cut to a suitable size. For example, a height of a structure formed by the mold 1532 may be ten feet in length (meaning that the mold 1532 is at least this same height). The structure may be cut to a desired length to form multiple sections, such as a four foot section and a six foot section from a ten foot structure formed by the mold 1532.

The system 1500 may further include a mold support structure 1600 for rotating, vibrating and indexing the mold 1526 beneath the discharge end 1506 of the mixing tube 1502. The structure 1600 may include a base member 1602 mounted on a set of wheels 1604. The wheels 1604 may be guided by tracks 1606. A ram arm 1608 may operated to move the base member 1602 on the tracks 1606. In an embodiment, the ram arm 1608 is operated by a hydraulic cylinder 1609.

A first support structure 1610 may be supported by the base member 1602. In particular, the first support structure 1610 may be coupled to a shaft 1612. In an embodiment, a motor 1614 may rotate the shaft 1612 such that the first support structure 1610 rotates about a vertical axis to thereby turn the mold 1526.

A second support structure 1616 may be disposed above, and may be supported by, the first support structure 1610. The second support structure 1616 may include a mold receiving surface 1618 onto which the mold 1526 is placed. The mold 1526 may be held in place on the mold receiving surface 1618 by a locking mechanism (not shown).

Attached to the second support structure 1616 may be vibrators 1620. The vibrators 1620 may be utilized to vibrate the mold 1526 as it is filled with an aggregate/resin mixture. In an embodiment, the vibrators 1620 may include a rotating weight mounted to a motor driven shaft. For example, a rotating shaft may be mounted in any suitable manner on or in connection with the second support structure 1616, and a weight (not shown) may be disposed on the shaft in an asymmetrical configuration about the shaft, such that a weight density of the weight is distributed in an asymmetrical manner about a rotational axis of the shaft. Stated another way, the weight is unbalanced, or mounted off center, on the shaft. In an embodiment, the vibrators 1620 may operate at a low frequency, high amplitude.

Figure 22:
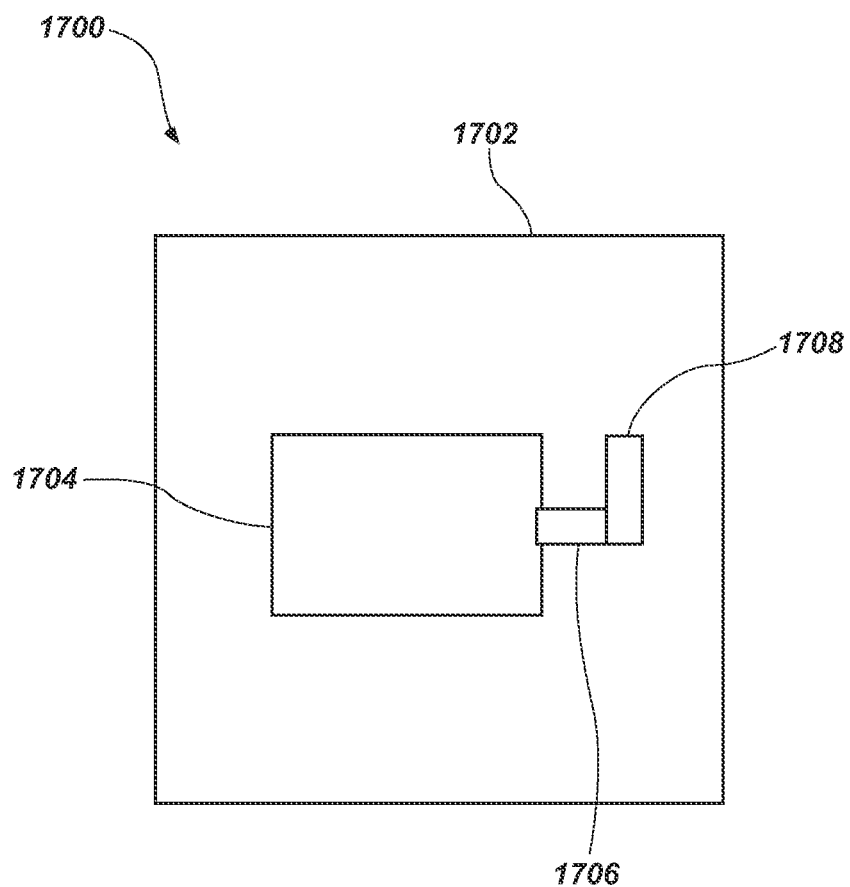
FIG. 22 is a diagram of a vibrator pursuant to an embodiment of the present disclosure.

Referring now to FIG. 22, there is shown a schematic of a vibrator 1700 suitable for use as the vibrators 1620. The vibrator 1700 may include a housing 1702. The housing 1702 may be mounted to a structure using fasteners, such as bolts. Disposed within the housing 1702 may be a motor 1704, such as an electrical or pneumatic motor. The motor 1704 may drive a shaft 1706. Disposed on the end of the shaft 1706 may be a weight 1708 that is mounted off center from the axis of rotation of the shaft 1706. As the shaft 1706 is turned by the motor 1704, the weight 1708 vibrates the housing 1702 and the structure to which the housing 1702 is mounted.

In an embodiment, at least one vibration isolator 1622 may be interposed between the first support structure 1610 and the second support structure 1616. In an embodiment, the at least one vibration isolator 1622 may be pneumatic, such as an airbag. It will be appreciated that the at least one vibration isolator 1622 may minimize the effects of vibrations on the first support structure 1610 to prevent damage to the motor 1614. In an embodiment, the second support structure 1616 rotates when the first support structure 1610 rotates.

The manner in which the mold 1526 may be filled with polymer concrete using the system 1500 will now be described. The mold 1526 may placed onto the mold receiving surface 1618 using a lift (not shown). The mold 1526 may then be indexed by the ram arm 1608 beneath the discharge end 1506 of the mixing tube 1502. The motor 1614 may then be activated to rotate the mold 1526 around a vertical axis. The vibrators 1620 may then be activated to cause the mold 1526 to vibrate.

Next, the motor 1504 may be activated to cause the auger (not shown) inside of the mixing tube 1502 to turn. With the auger turning, aggregate may be fed into the hopper 1514 where it is gravity fed into the mixing tube 1502. A resin mixture in the reservoir 1516, with any desirable pigments, may be fed through the tube 1518 into the mixing tube 1502 where it is mixed with the aggregate. The catalyst in the reservoir 1520 is then fed into the mixing tube 1502 through the tube 1522 and mixed by the auger with the resin and aggregate mixture.

The aggregate/resin/catalyst mixture in the mixing tube 1502 is then pushed by the auger out of the discharge end 1506 and into the snorkel 1524 where it is guided into the mold 1526. As shown by the cutaway portion 1550 of the mold 1526 in FIG. 19, the snorkel 1524 directs that mixture from the discharge end 1506 of the mixing tube 1502 into the mold 1526. In an embodiment, the snorkel 1524 may comprise a flexible material.

As shown in FIG. 19, because of the rotation and vibration of the mold 1526, the mixture from the mixing tube 1502 may form a first layer 1650 having a top surface 1652 and a second layer 1654. This process continues, layer by layer, until the mold 1526 is filled to the top with the mixture discharged from the mixing tube 1502.

Once the mold 1526 is full, it may be hoisted off of the mold receiving surface 1618 onto the ground, where the inner mold 1528 and the outer mold 1530 are removed. It will be appreciated that the mold 1526 used with the system 1500 may take a wide variety of forms, including molds to form the structures shown in FIGS. 6 and 8-16.

Figure 20:
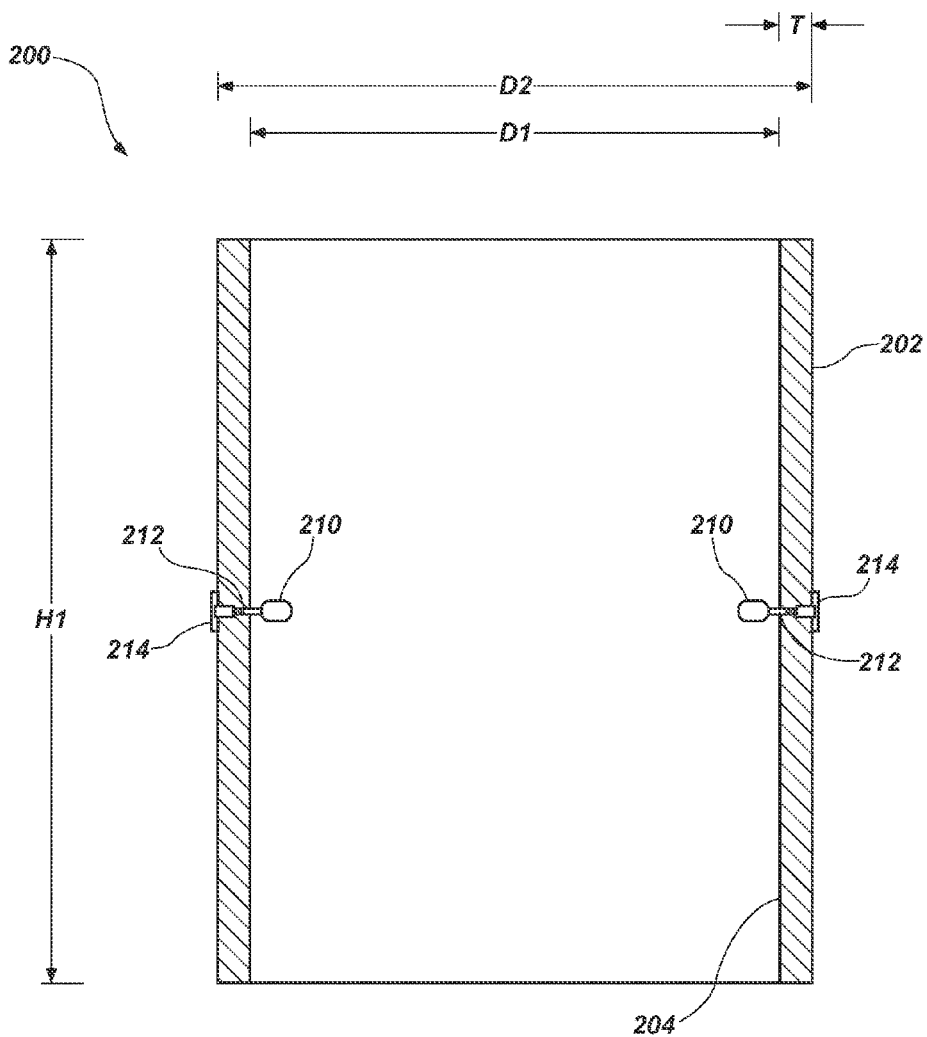
FIG. 20 is a cross-sectional view of a polymer concrete structure having projections extending from an inner surface.

Referring now to FIGS. 6 and 20, as previously discussed, the structure 200 that may be formed by the system 1500 shown in FIG. 19. In an embodiment, the structure 200 may be used as a riser in a manhole assembly. In an embodiment, the height, H1, of the structure 200 may be between one foot and six feet, such as one foot, two feet, three feet, four feet, five feet, or six feet. In an embodiment, the height, H1, of the structure 200 may be greater than four feet, greater than five feet, greater than six feet, greater than seven feet, or greater than eight feet.

In an embodiment, the inner diameter, D1, may be between 36 inches and 72 inches, or between 48 inches and 60 inches, or 48 inches, or 60 inches. In an embodiment, the wall thickness, T (also D2 minus D1), between the outer surface 202 and the inner surface 204 may be less than $\frac{1}{12}$th of the length of the inner diameter, D1. In an embodiment, the outer diameter D2, may be the length of the inner diameter, D1, plus the wall thickness, T. In an embodiment, the wall thickness, T, may be between one and three inches. In an embodiment, the wall thickness, T, may be two inches. In an embodiment, the wall thickness, T, may be greater than one-half of an inch.

A desirable characteristic of the structure 200 cast by the system 1500 may be its strength. In an embodiment, the sidewall of the structure 200 is adapted to bear at least 10,000 psi in compression without failure. In an embodiment, the sidewall of the structure 200 is adapted to bear at least 2,000 psi in tension without failure. As used herein, the concept of a material or a structure that experiences failure in compression or tension, means that the material or structure undergoes breaking, fracturing, cracking, or buckling.

In an embodiment, the resin content of the structure 200 is between 5% to 35% of the volume of the structure 200. In an embodiment, the resin content of the structure 200 is 7% to 27% of the volume of the structure 200. In an embodiment, the resin content of the structure 200 is 10% to 17% of the volume of the structure 200. In an embodiment, the resin may include one or more of a polymer resin, a polyester resin, a pure cast resin, a crushed glass resin, fiberglass, a composite material, plastic, and an inorganic material.

In an embodiment, the structure 200 formed by the system 1500 comprises aggregate. In an embodiment, the aggregate comprises coarse aggregate and fine aggregate. In an embodiment, the coarse aggregate comprises 30% to 60% of the volume of the structure 200. In an embodiment, the coarse aggregate comprises 45% to 55% of the volume of the structure 200. In an embodiment, the coarse aggregate comprises 30% of the volume of the structure 200. In an embodiment, the fine aggregate comprises 30% to 60% of the volume of the structure 200. In an embodiment, the fine aggregate comprises 45% to 55% of the volume of the structure 200. In an embodiment, the fine aggregate comprises 30% of the volume of the structure 200.

In an embodiment, the structure 200 may have a height, H1, that is less than twice the inner diameter, D1. In an embodiment, the structure 200 may have a height, H1, that is less than one to two times the inner diameter, D1. In an embodiment, the structure 200 may have a height, H1, that is less than 1.25 to 1.75 times the inner diameter, D1.

Referring now to FIG. 20, extending from the inner surface 204 of the structure 200 may be projection members 210. In an embodiment, the projection members 210 may allow the structure 200 to be attached to a lift device, such as a chain, strap or hook. In this regard, the projections 210 allow the structure 200 to be easily lifted, moved, and transported. In an embodiment, each of the projection members 210 may include a threaded shaft 212 in the polymer sidewalls of the structure 200 that is treadably coupled to a cap 214. In an embodiment, the projection members 210 are formed from plastic. In an embodiment, the projection member 210 may comprise an eyelet. It will be appreciated that the structure 200 is characterized by an absence of cement. It will be appreciated that the structure 200 is formed of a non-corrosive material by the system 1500.

Figure 21:
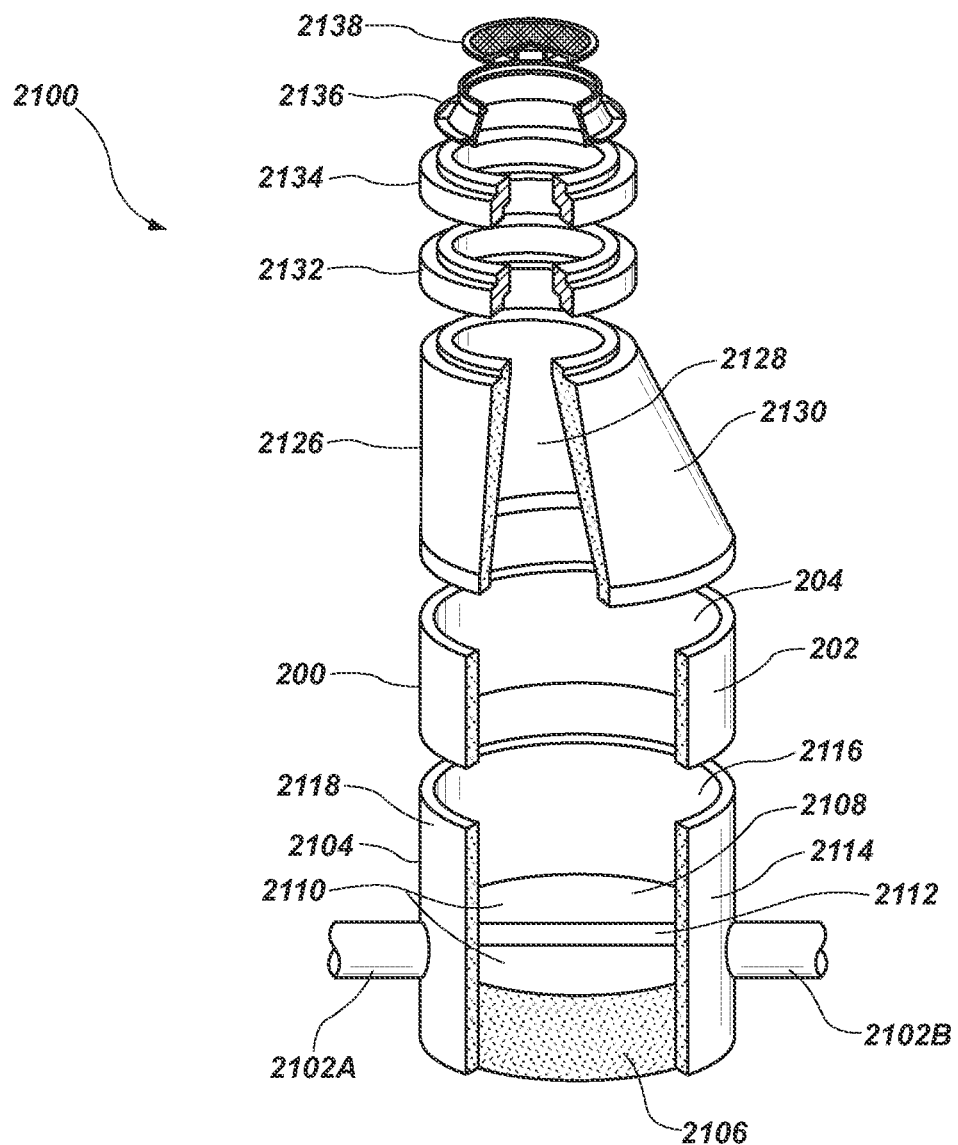
FIG. 21 is an exploded view of a manhole assembly according to an embodiment of the present disclosure.

Referring now to FIG. 21, there is depicted a modular manhole structure 2100 pursuant to an embodiment of the present disclosure. The structure 2100 may be connected to a municipal wastewater system at an inlet 2102A and an outlet 2102B. The structure 2100 may allow access to the wastewater system as is known to one having ordinary skill in the art.

The structure 2100 may comprise a base section 2104. The base section 2104 may have a bottom portion 2106. The bottom portion 2106 may have an upper surface 2108. The upper surface 2108 may include a bench or shelf 2110 and an invert 2112 that forms a trough or flow channel to provide access to the wastewater. The invert 2112 may be connected to pipes 2102A and 2102B.

The base section 2104 may have an upwardly ascending riser portion 2114. The riser portion 2114 may have an inner surface 2116 and an outer surface 2118. The inner surface 2116 may form part of an access passageway from the top of the structure 2100 to the invert 2112. The riser portion 2114 may circumscribe the surface 2108.

The riser section 200 may be stacked on the riser portion 2114 of the base section 2104. The riser section 200 may have an inner surface 204 and an outer surface 202. A cone section 2126 may be stacked on the riser section 200. The cone section 2126 may include an inner surface 2128 and an outer surface 2130. A first ring section 2132 and a second ring section 2134 may be stacked upon the cone section 2126. A metal support ring 2136 and a manhole cover 2138 may be installed onto the second ring section 2134.

In an embodiment of the present disclosure, the base section 2104, the riser section 200, the cone section 2126, and the rings 2132 and 2134 may be cast from polymer concrete using the system 1500. The base section 2104, the riser section 2120, the cone section 2126, and the rings 2132 and 2134 may be pre-cast polymer concrete structures, meaning that they are not formed on site but are pre-formed a fabrication site.

It will be appreciated that the wastewater structure 2100 may take multiple forms to satisfy a wide range of operating requirements. For example, the structure 2100 may have multiple risers 200. The structure 2100 shown in FIG. 21 is exemplary and should not be considered limiting on the present disclosure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A manhole apparatus having a wastewater inlet and a wastewater outlet configured and adapted to be connected to a municipal wastewater system, the manhole apparatus comprising:
   a base portion having an upper surface that includes a fluid trough extending between the wastewater inlet and the wastewater outlet;
   a top portion defining a worker access opening; and
   a riser portion interposed between the base portion and the top portion, the riser portion having a sidewall that defines a circular passageway having an inner diameter;
   wherein a thickness of the sidewall of the riser portion is less than 1/12th of the inner diameter of the circular passageway and the sidewall is adapted to bear at least 10,000 psi in compression and at least 2,000 psi in tension, without failure;
   wherein the sidewall comprises a polymer concrete material including: a polymer resin and an aggregate mixture having only a coarse aggregate and a fine aggregate;
   wherein the inner diameter of the circular passageway is at least 48 inches; and
   wherein a thickness of the sidewall is between one inch and three inches.

2. The manhole apparatus of claim 1, wherein the sidewall is formed from a non-corrosive material.

3. The manhole apparatus of claim 1, wherein the sidewall is characterized by an absence of cement.

4. The manhole apparatus of claim 1, wherein the polymer resin comprises between 5% and 35% of the polymer resin and aggregate mixture.

5. The manhole apparatus of claim 4, wherein the polymer resin comprises between 7% and 27% of the polymer resin and aggregate mixture.

6. The manhole apparatus of claim 5, wherein the polymer resin comprises between 10% and 17% of the polymer resin and aggregate mixture.

7. The manhole apparatus of claim 1, wherein the coarse aggregate comprises one of 30%, 30% to 60%, and 45% to 55% of the aggregate in the polymer resin and aggregate mixture.

8. The manhole apparatus of claim 1, wherein the fine aggregate comprises one of 30%, 30% to 60%, and 45% to 55% of the aggregate in the polymer resin and aggregate mixture.

9. The manhole apparatus of claim 1, wherein the fine aggregate comprises a fine sift sand.

10. The manhole apparatus of claim 1, wherein the aggregate in the polymer resin and aggregate mixture comprises one or more of a pure cast resin, a crushed glass resin, fiberglass, a composite material, plastic, and an inorganic material.

11. The manhole apparatus of claim 1, wherein a thickness of the sidewall is about two inches.

12. The manhole apparatus of claim 1, wherein a height of the riser portion is greater than 4 feet.

13. The manhole apparatus of claim 1, wherein the base portion is separated from the riser portion by a joint.

14. The manhole apparatus of claim 13, where the riser portion is separated from the top portion by a joint.

15. The manhole apparatus of claim 1, wherein the top portion comprises a cone.

16. The manhole apparatus of claim 15, wherein the top portion further comprises a grade ring.

17. The manhole apparatus of claim 1, wherein at least one of the course aggregate and the fine aggregate is composed of rocks.

18. The manhole apparatus of claim 1, wherein at least one of the course aggregate and the fine aggregate is composed of sand.

19. A manhole apparatus having a wastewater inlet and a wastewater outlet configured and adapted to be connected to a municipal wastewater system, the manhole apparatus comprising:
   a base portion having an upper surface that includes a fluid trough extending between the wastewater inlet and the wastewater outlet;
   a top portion defining a worker access opening;
   a riser portion interposed between the base portion and the top portion, the riser portion having a sidewall that defines a circular passageway having an inner diameter;
   wherein a thickness of the sidewall of the riser portion is less than 1/12th of the diameter of the circular passageway;
   wherein the sidewall is adapted to bear at least 10,000 psi in compression without failure;
   wherein the sidewall is adapted to bear at least 2,000 psi in tension without failure;

wherein the sidewall is formed from a non-corrosive material;

wherein the sidewall is characterized by an absence of cement;

wherein the diameter of the circular passageway is at least 48 inches;

wherein the sidewall, having a volume, comprises a polymer concrete material including: a polymer resin and an aggregate mixture having only a coarse aggregate and a fine aggregate, wherein the coarse aggregate comprises 45-55% of the volume of the sidewall and the fine aggregate comprises 45-55% of the volume of the sidewall;

wherein the fine aggregate comprises a fine sift sand;

wherein the aggregate in the polymer resin and aggregate mixture comprises one or more of a pure cast resin, a crushed glass resin, fiberglass, a composite material, plastic, and an inorganic material;

wherein a thickness of the sidewall is between one inch and three inches;

wherein the base portion is separated from the riser portion by a joint;

wherein the riser portion is separated from the top portion by a joint;

wherein the top portion comprises a cone;

wherein the top portion further comprises a grade ring.

20. A manhole apparatus having a wastewater inlet and a wastewater outlet configured and adapted to be connected to a municipal wastewater system, the manhole apparatus comprising:

a base portion having an upper surface that includes a fluid trough extending between the wastewater inlet and the wastewater outlet;

a top portion defining a worker access opening; and a riser portion interposed between the base portion and the top portion, the riser portion having a sidewall that defines a circular passageway having an inner diameter;

wherein a thickness of the sidewall of the riser portion is less than $1/12$th of the inner diameter of the circular passageway and the sidewall is adapted to bear at least 10,000 psi in compression and at least 2,000 psi in tension, without failure;

wherein the sidewall, having a volume, comprises a polymer concrete material including: a polymer resin and an aggregate mixture having a coarse aggregate and a fine aggregate, wherein the coarse aggregate comprises 45-55% of the volume of the sidewall and the fine aggregate comprises 45-55% of the volume of the sidewall;

wherein the inner diameter of the circular passageway is at least 48 inches; and wherein a thickness of the sidewall is between one inch and three inches.

21. A manhole apparatus having a wastewater inlet and a wastewater outlet configured and adapted to be connected to a municipal wastewater system, the manhole apparatus comprising:

a base portion having an upper surface that includes a fluid trough extending between the wastewater inlet and the wastewater outlet;

a top portion defining a worker access opening; and a riser portion interposed between the base portion and the top portion, the riser portion having a sidewall that defines a circular passageway having an inner diameter;

wherein a thickness of the sidewall of the riser portion is less than $1/12$th of the inner diameter of the circular passageway and the sidewall is adapted to bear at least 10,000 psi in compression and at least 2,000 psi in tension, without failure;

wherein the sidewall, having a volume, comprises a polymer concrete material including: a polymer resin and an aggregate mixture having a coarse aggregate and a fine aggregate, wherein the coarse aggregate is 60% of the volume of the sidewall and the fine aggregate is 30% of the volume of the sidewall and the polymer resin is 10% of the volume of the sidewall;

wherein the inner diameter of the circular passageway is at least 48 inches; and wherein a thickness of the sidewall is between one inch and three inches.

22. A manhole apparatus having a wastewater inlet and a wastewater outlet configured and adapted to be connected to a municipal wastewater system, the manhole apparatus comprising:

a base portion having an upper surface that includes a fluid trough extending between the wastewater inlet and the wastewater outlet;

a top portion defining a worker access opening; and a riser portion interposed between the base portion and the top portion, the riser portion having a sidewall that defines a circular passageway having an inner diameter;

wherein a thickness of the sidewall of the riser portion is less than $1/12$th of the inner diameter of the circular passageway and the sidewall is adapted to bear at least 10,000 psi in compression and at least 2,000 psi in tension, without failure;

wherein the sidewall, having a volume, comprises a polymer concrete material including: a polymer resin and an aggregate mixture having a coarse aggregate and a fine aggregate, wherein the coarse aggregate is 30% of the volume of the sidewall and the fine aggregate is 60% of the volume of the sidewall and the polymer resin is 10% of the volume of the sidewall;

wherein the inner diameter of the circular passageway is at least 48 inches; and wherein a thickness of the sidewall is between one inch and three inches.

* * * * *